(12) United States Patent
Zhao et al.

(10) Patent No.: US 12,335,047 B2
(45) Date of Patent: Jun. 17, 2025

(54) METHOD FOR INFORMATION FEEDBACK AND RELATED DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 434 days.

(21) Appl. No.: 17/810,974

(22) Filed: Jul. 6, 2022

(65) Prior Publication Data
US 2022/0337352 A1 Oct. 20, 2022

Related U.S. Application Data

(63) Continuation of application No. PCT/CN2020/072563, filed on Jan. 16, 2020.

(51) Int. Cl.
*H04W 72/30* (2023.01)
*H04L 1/1812* (2023.01)

(52) U.S. Cl.
CPC .......... *H04L 1/1816* (2013.01); *H04W 72/30* (2023.01)

(58) Field of Classification Search
CPC .............................. H04L 1/1816; H04W 72/30
See application file for complete search history.

(56) References Cited

U.S. PATENT DOCUMENTS

| | | | |
|---|---|---|---|
| 10,587,372 B2* | 3/2020 | Seo | ................. H04L 1/00 |
| 2018/0076935 A1 | 3/2018 | Seo et al. | |
| 2019/0274131 A1 | 9/2019 | Yamazaki et al. | |
| 2019/0356427 A1 | 11/2019 | Babaei et al. | |
| 2020/0204329 A1 | 6/2020 | Fujishiro et al. | |
| 2020/0295882 A1* | 9/2020 | Wang | ................. H04L 1/1896 |
| 2021/0105126 A1* | 4/2021 | Yi | ................. H04L 1/1671 |
| 2021/0160013 A1* | 5/2021 | Kim | ................. H04B 7/024 |
| 2021/0219329 A1* | 7/2021 | Zhou | ................. H04L 1/1896 |
| 2021/0314102 A1* | 10/2021 | Li | ................. H04L 1/1614 |

(Continued)

FOREIGN PATENT DOCUMENTS

| | | |
|---|---|---|
| CN | 107231219 A | 10/2017 |
| CN | 108616339 A | 10/2018 |

(Continued)

OTHER PUBLICATIONS

The extended European search report issued in corresponding EP application No. 20913189.5 dated Nov. 14, 2022. 8 pages.
First Examination Report issued in corresponding IN application No. 202217040088 dated Dec. 13, 2022. 7 pages with English translation.
Office action issued in corresponding RU application No. 2022121499 dated Nov. 30, 2022. 16 pages with English translation.

(Continued)

*Primary Examiner* — Rafael Perez-Gutierrez
*Assistant Examiner* — Gilbert M. Grant
(74) *Attorney, Agent, or Firm* — PERKINS COIE LLP

(57) ABSTRACT

A method for information feedback and related devices are provided. The method includes the following. A terminal receives preset information from a network device, where the preset information at least includes point-to-multipoint (PTM) transmission information. The terminal feeds back HARQ response information of the preset information to the network device, where the HARQ response information includes HARQ response information of the PTM transmission information.

14 Claims, 5 Drawing Sheets

(56) References Cited

U.S. PATENT DOCUMENTS

2022/0360950 A1* 11/2022 Li .................. H04L 1/1854
2022/0368502 A1* 11/2022 Son ................. H04L 1/1864

FOREIGN PATENT DOCUMENTS

| CN | 109121464 A | 1/2019 |
| --- | --- | --- |
| EP | 3051727 A1 | 8/2016 |
| EP | 3051734 A1 | 8/2016 |
| JP | 2010516188 A | 5/2010 |
| RU | 2439815 C2 | 1/2012 |
| RU | 2533188 C2 | 11/2014 |
| RU | 2592068 C2 | 7/2016 |
| WO | 2010124434 A1 | 11/2010 |
| WO | 2011147246 A1 | 12/2011 |
| WO | 2015106442 A1 | 7/2015 |
| WO | 2018021298 A1 | 2/2018 |
| WO | 2018027906 A1 | 2/2018 |
| WO | 2018056108 A1 | 3/2018 |
| WO | 2019098896 A1 | 5/2019 |

OTHER PUBLICATIONS

Huawei, 3GPP TSG-RAN WG2#89, R2-150623, "UL feedback for SC-PTM", dated Feb. 12, 2015.
WIPO, International Search Report and Written Opinion for International Application No. PCT/CN2020/072563, Oct. 20, 2020.
Ericsson, 3GPP TSG-RAN WG1 Meeting #99, R1-1912598, "Uu-based sidelink resource allocation", dated Nov. 11, 2019.
The first office action issued in corresponding CN application No. 202210999096.1 dated Aug. 4, 2023. (14 pages with translation).
Communication pursuant to Article 94(3) EPC issued in corresponding EP application No. 20913189.5 dated Aug. 22, 2023. (5 pages).
Notice of reasons for refusal issued in corresponding JP application No. 2022-542488 dated Sep. 5, 2023. (8 pages with translation).
Communication pursuant to Article 94(3) EPC issued in corresponding EP application No. 20913189.5 dated Jan. 16, 2024. (4 pages).
Office action issued in corresponding VN application No. 1-2022-04895 dated Aug. 28, 2024. 4 pages (with English translation).
Notice of preliminary rejection issued in corresponding KR application No. 10-2022-7024434 dated Apr. 1, 2025. 13 pages (with English translation).

* cited by examiner

METHOD FOR INFORMATION FEEDBACK AND RELATED DEVICE

CROSS REFERENCE TO RELATED APPLICATION(S)

This application is a continuation of International Application No. PCT/CN2020/072563, filed Jan. 16, 2020, the entire disclosure of which is incorporated herein by reference.

TECHNICAL FIELD

This application relates to the technical field of communication, and more particularly, to a method for information feedback and related devices.

BACKGROUND

In new radio access (NR), there is feedback of hybrid automatic repeat request (HARQ) response information (HARQ-acknowledge (ACK) information or HARQ-negative acknowledgment (NACK) information) in unicast transmission in a radio resource control (RRC) connection state, while there is no feedback mechanism in multicast or broadcast in the RRC state. That is, there is no feedback when user equipment (UE) receives a multicast or broadcast service, and there is no remedy even if service data is lost.

SUMMARY

In a first aspect, embodiments of the disclosure provide a method for information feedback. The method includes the following. A terminal receives preset information from a network device, where the preset information at least includes point-to-multipoint (PTM) transmission information. The terminal feeds back hybrid automatic repeat request (HARQ) response information of the preset information to the network device, where the HARQ response information includes HARQ response information of the PTM transmission information.

In a second aspect, embodiments of the disclosure provide a method for information feedback. The method includes the following. A network device transmits preset information to a terminal, where the preset information at least includes PTM transmission information. The network device receives HARQ response information of the preset information fed back by the terminal, where the HARQ response information includes HARQ response information of the PTM transmission information.

In a third aspect, embodiments of the disclosure provide a terminal. The terminal includes a processor, a transceiver, and a memory configured to store one or more programs. The processor is configured to invoke and execute the computer programs stored in the memory to cause the transceiver to: receive preset information from a network device, where the preset information at least includes PTM transmission information, and feed back HARQ response information of the preset information to the network device, where the HARQ response information includes HARQ response information of the PTM transmission information.

BRIEF DESCRIPTION OF THE DRAWINGS

The following will give a brief introduction to accompanying drawings used for describing embodiments or the related art.

DETAILED DESCRIPTION

The following will describe technical solutions of embodiments of the disclosure with reference to the accompanying drawings.

Figure 1:
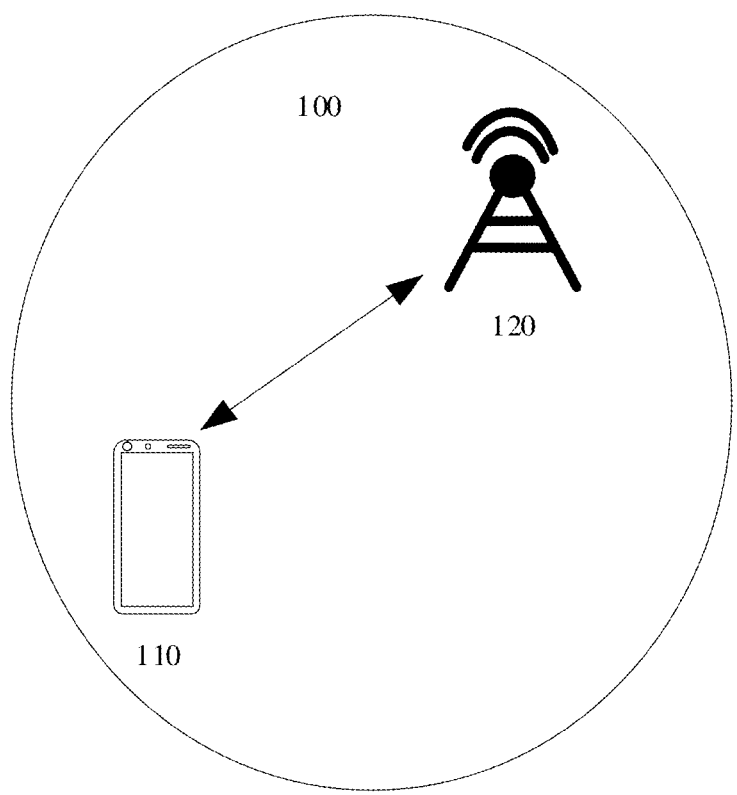
FIG. 1 is a system architecture diagram of an example communication system provided in embodiments of the disclosure.

Technical solutions of embodiments of the disclosure may be applied to an example communication system 100 illustrated in FIG. 1. The example communication system 100 includes a terminal 110 and a network device 120, and the terminal 110 is communicatively coupled with the network device 120.

The example communication system 100 may be, for example, a non-terrestrial network (NTN) system, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (LTE-TDD) system, a universal mobile telecommunication system (UMTS), a worldwide interoperability for microwave access (WiMAX) communication system, a 5th generation (5G) system, or a new radio (NR) system.

The terminal 110 of embodiments of the disclosure may refer to a UE, an access terminal, a subscriber unit, a subscriber station, a mobile station, a remote station, a remote terminal, a mobile device, a user terminal, a terminal, a wireless communication device, a user agent, or a user device. The terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, a relay device, an in-vehicle device, a wearable device, a terminal in a 5G network, a terminal in a future evolved public land mobile network (PLMN), or the like, which is not limited herein.

The network device 120 of embodiments of the disclosure may be a device that communicates with the terminal. The network device may be a base transceiver station (BTS) in the GSM or in the CDMA system, or may be a NodeB (NB)

in the WCDMA system, or may be an evolved Node B (eNB or eNodeB) in the LTE system, or may be a radio controller in a cloud radio access network (CRAN). Alternatively, the network device may be a relay device, an access point, an in-vehicle device, a wearable device, a network device in the 5G network, or a network device in a future evolved PLMN, an antenna panel or a group of antenna panels (including multiple antenna panels) of a base station in the 5G system, or may be a network node forming a gNB or a transmission point, such as a baseband unit (BBU) or a distributed unit (DU), which is not limited herein.

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing non-real-time protocols and services, and implements functions of a radio resource control (RRC) layer and functions of a packet data convergence protocol (PDCP) layer. The DU is responsible for processing physical (PHY) layer protocols and real-time services, and implements functions of a radio link control (RLC) layer, functions of a media access control (MAC) layer, and functions of a PHY layer. AAU implements some PHY layer processing functions, radio frequency processing functions, and active-antenna related functions. Since RRC layer information will eventually become PHY layer information, or is transformed from PHY layer information, in this architecture, it may be considered that higher layer signaling, such as RRC layer signaling, is transmitted by the DU, or transmitted by the DU and the AAU. It can be understood that, the network device may be a device including one or more of a CU node, a DU node, and an AAU node. In addition, the CU may be categorized as a network device in a radio access network (RAN), or may be categorized as a network device in a core network (CN), which is not limited herein.

In embodiments of the disclosure, the terminal 110 or the network device 120 includes a hardware layer, an operating system layer running above the hardware layer, and an application layer running above the operating system layer. The hardware layer includes hardware such as a central processing unit (CPU), a memory management unit (MMU), and a memory (also referred to as main memory). The operating system may be any one or more computer operating systems that achieve service processing through a process, for example, a Linux operating system, a Unix operating system, an Android operating system, an iOS operating system, or a Windows operating system. The application layer includes applications such as a browser, a contact list, word processing software, and instant messaging (IM) software. In addition, embodiments of the disclosure do not constitute limitation on the structure of an execution entity of a method provided in embodiments, as long as the execution entity can communicate according to the method provided herein by running programs that record codes of the method. For example, the execution entity of the method may be the terminal, or may be a functional module in the terminal that can invoke and execute programs.

At present, in the NR system, there is no feedback when user equipment (UE) receives a multicast or broadcast service, and there is no remedy even if service data is lost.

In view of the above problem, embodiments of the disclosure propose a method for information feedback, so that in the NR system, a single cell point-to-multipoint (SC-PTM) or multimedia broadcast multicast service (MBMS) multicast or broadcast service (hereinafter referred to as point-to-multipoint (PTM) transmission) is supported. A method for the terminal to report hybrid automatic repeat request (HARQ) feedback information of a SC-PTM or MBMS service to the network is described in detail below with reference to accompanying drawings.

Figure 2A:
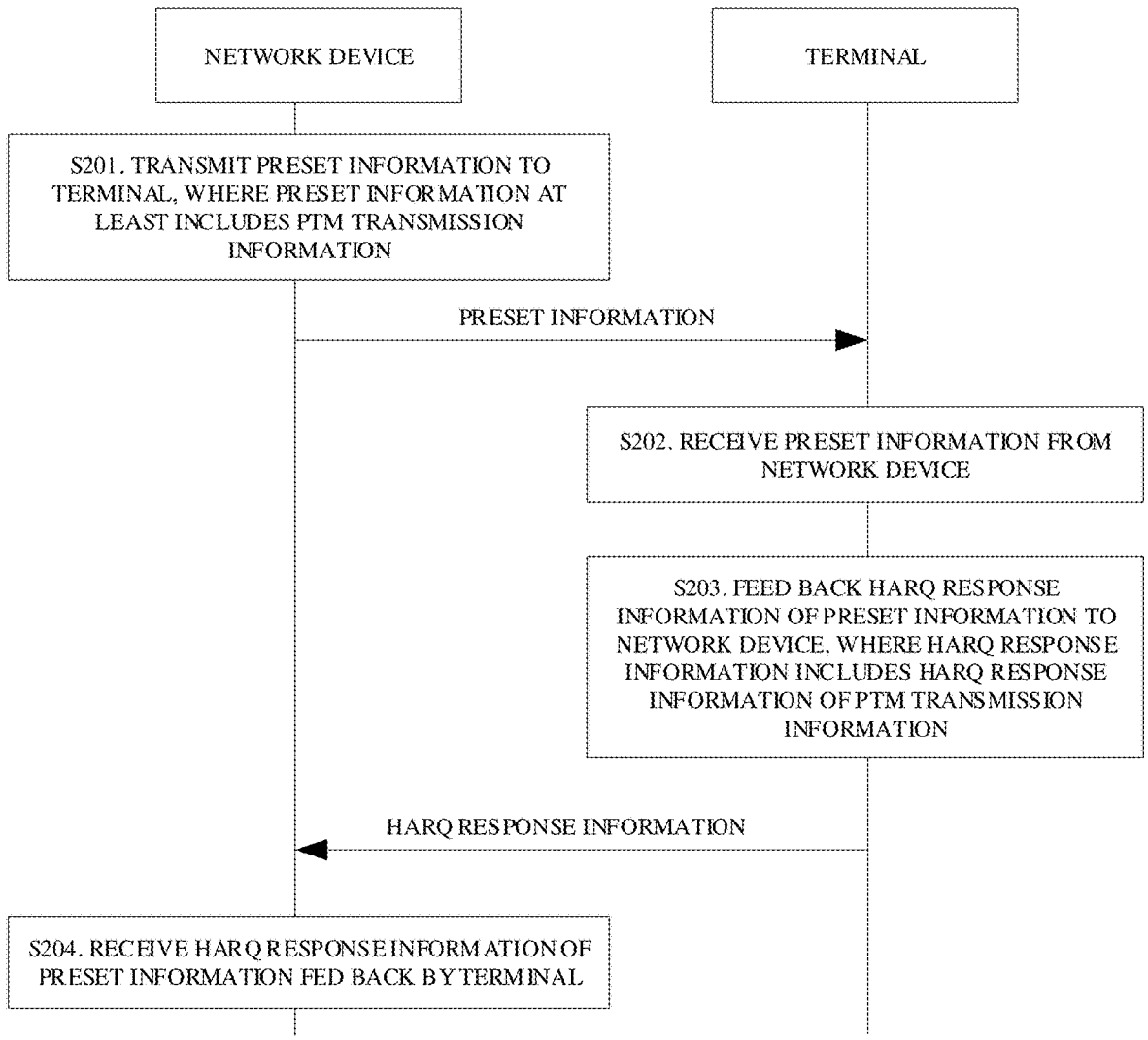
FIG. 2A is a schematic flowchart of a method for information feedback provided in embodiments of the disclosure.

Referring to FIG. 2A, FIG. 2A is a schematic flowchart of a method for information feedback provided in embodiments of the disclosure. As illustrated in FIG. 2A, the method includes the following.

S201. A network device transmits preset information to a terminal, where the preset information at least includes PTM transmission information.

The preset message may include one piece of PTM transmission information, multiple pieces of PTM transmission information, one or more pieces of PTM transmission information, and one or more pieces of unicast transmission information, which is not specifically limited herein.

The PTM transmission information may be multicast information, broadcast information, or the like.

S202. The terminal receives the preset information from the network device.

S203. The terminal feeds back HARQ response information of the preset information to the network device, where the HARQ response information includes HARQ response information of the PTM transmission information.

The terminal determines the HARQ response information to feed back according to a transmission result of the preset information. For example, HARQ-acknowledge (ACK) information is fed back if the transmission succeeds, and HARQ-negative acknowledgment (NACK) information is fed back if the transmission fails. Alternatively, HARQ-NACK information is fed back if the transmission fails, and no information is fed back if the transmission succeeds.

S204. The network device receives the HARQ response information of the preset information fed back by the terminal.

The network device determines whether retransmission is required upon reception of the HARQ response information. For example, if the HARQ response information is HARQ-ACK information, it means that the transmission succeeds and no retransmission is required, and if the HARQ response information is HARQ-NACK information, it means that the transmission fails and retransmission is required.

It can be seen that, in embodiments of the disclosure, the terminal receives the preset information from the network device, where the preset information at least includes the PTM transmission information, and the terminal feeds back the HARQ response information of the preset information to the network device, where the HARQ response information includes the HARQ response information of the PTM transmission information. It can be seen that, in the disclosure, there is a HARQ feedback mechanism when the terminal receives the PTM transmission information. When service data of PTM transmission is lost, the network device can determine whether a retransmission needs to be transmitted according to HARQ feedback information, which is beneficial to ensuring the reliability of service data transmission.

In a possible example, the terminal receives the preset information from the network device as follows. The terminal receives downlink control information (DCI) scheduling the preset information from the network device. The terminal receives the preset information according to indication information in the DCI.

For example, the terminal receives a DCI scheduling PTM transmission transmitted by the network device, and receives the PTM transmission according to the DCI indication.

It can be seen that, in this example, the terminal can receive PTM transmission information or unicast transmission information transmitted by the network device according to the DCI indication transmitted by the network device.

In a possible example, the method further includes the following. The terminal determines an uplink (UL) resource for the HARQ response information of the preset information according to the indication information in the DCI.

The UL resource may be a physical uplink control channel (PUCCH) time-frequency resource or a physical uplink shared channel (PUSCH) time-frequency resource.

A UL resource for HARQ-ACK feedback of PTM transmission and a UL resource for HARQ-ACK feedback of unicast transmission should be located in different time slots or in different OFDM symbols in a same time slot.

For example, the terminal receives a DCI scheduling PTM transmission transmitted by the network device, receives the PTM transmission according to the DCI indication, and determines a UL resource for feeding back HARQ-ACK feedback information of the PTM transmission at least according to the indication information in the DCI.

It can be seen that, in this example, the terminal can determine the UL resource for feeding back the HARQ response information to the network device according to the DCI transmitted by the network device, thereby facilitating the terminal to feed back HARQ response information of PTM transmission information.

In a possible example, the preset information includes multiple pieces of PTM transmission information, and the terminal feeds back the HARQ response information of the preset information to the network device as follows. The terminal feeds back HARQ response information of the multiple pieces of PTM transmission information to the network device by using different orthogonal UL resources.

It can be seen that, in this example, the terminal feeds back the HARQ response information of the multiple pieces of PTM transmission information to the network device by using different orthogonal UL resources, thereby preventing the terminal from feeding back HARQ-ACK information of multiple data transmissions in a same UL resource, which is beneficial to reducing the complexity.

In a possible example, if the multiple pieces of PTM transmission information are received by the terminal in multiple time slots, the terminal feeds back the HARQ response information of the multiple pieces of PTM transmission information to the network device by using different orthogonal UL resources as follows. If UL resources for the HARQ response information of the multiple pieces of PTM transmission information overlap in time domain, and the multiple pieces of PTM transmission information each transmit different transport blocks (TB), the terminal feeds back HARQ response information of PTM transmission information in one of the time slots to the network device.

For any two PTM transmissions indicated by the network device that occur in different time slots, if different TBs are transmitted in the two PTM transmissions, it is undesirable for the terminal that UL resources indicated by the network device for HARQ-ACK feedback of the two PTM transmissions overlap in time domain.

For example, if HARQ-ACK UL resources corresponding to PTM transmissions received by the terminal in multiple time slots overlap in time, and multiple different TBs are transmitted in the multiple PTM transmissions, the terminal only feeds back HARQ-ACK information of a PTM transmission in one time slot.

It can be seen that, in this example, when UL resources for the HARQ response information of the multiple pieces of PTM transmission information received by the terminal in the multiple time slots overlap in time domain, the terminal only feeds back HARQ response information of PTM transmission information in one of the time slots to the network device, thereby preventing the terminal from feeding back HARQ-ACK information of multiple TBs in a same UL resource, which is beneficial to reducing the complexity.

In a possible example, the HARQ response information of the PTM transmission information in the one of the time slots is determined by the terminal according to an implementation of the terminal, an order of start time of transmission of DCIs corresponding to the multiple pieces of PTM transmission information, or priorities of the multiple pieces of PTM transmission information.

For example, when UL resources for HARQ-ACK feedback of multiple PTM transmissions indicated by the network device overlap in time domain, the terminal can only feed back HARQ-ACK information of one PTM transmission, and the terminal can select HARQ-ACK information to feed back according to one of the following rules.

(1) The terminal determines HARQ-ACK information to feed back according to an implementation of the terminal.

(2) The terminal feeds back HARQ-ACK information corresponding to transmission whose scheduling DCI has the latest start time. For example, if transmission of a DCI scheduling PTM1 transmission starts at time slot n, transmission of a DCI scheduling PTM2 starts at time slot n+1, and UL resources for HARQ-ACK information feedback of the two PTM transmissions coincide on time slot m, the terminal only feeds back HARQ-ACK information of PTM2.

(3) The terminal feeds back HARQ-ACK information of a PTM transmission with a higher priority. A priority of each PTM is indicated via a DCI scheduling transmission of the PTM. For example, if both PTM 1 and PTM2 carry a vehicle to X (V2X) service, and a priority of PTM 1 is higher than a priority of PTM2, that is, a priority indication index ProSePerPacketPriority (PPPP) of PTM1 is less than a priority indication index PPPP of PTM2, the terminal only feeds back HARQ-ACK information of PTM1. Alternatively, if PTM1 carries a V2X service and PTM2 carries a non-V2X service, if the PPPP of PTM1 is less than a specific threshold configured by the network device, the terminal feeds back the HARQ-ACK information of PTM1, otherwise, the terminal feeds back the HARQ-ACK information of PTM2. Alternatively, if the DCI scheduling PTM1 is scrambled with scrambling code 1 (PTM-RNTI1), the DCI scheduling PTM2 is scrambled with scrambling code 2 (PTM-RNTI2), and a priority corresponding to PTM-RNTI1 configured by the network device is higher than a priority corresponding to PTN-RNTI2, the terminal feeds back HARQ-ACK feedback information of PTM1.

It can be seen that, in this example, when UL resources for the HARQ response information of the multiple pieces of PTM transmission information received by the terminal in the multiple time slots overlap in time domain, the terminal only feeds back HARQ response information of PTM transmission information in one of the time slots to the network device, the terminal can determine the specific HARQ response information of the PTM transmission information in the one of the time slots according to the implementation of the terminal, the order of start time of transmission of DCIs corresponding to the multiple pieces of PTM transmission information, or the priorities of the multiple pieces of PTM transmission information, which is beneficial to providing the terminal with multiple criteria for selecting HARQ-ACK information to feed back.

In a possible example, if the multiple pieces of PTM transmission information are received by the terminal in multiple time slots, the terminal feeds back the HARQ response information of the multiple pieces of PTM transmission information to the network device by using the different orthogonal UL resources as follows. If different scrambling codes are used for DCIs scheduling the multiple pieces of PTM transmission information, the terminal feeds back HARQ response information of one of the multiple pieces of PTM transmission information scheduled by a DCI corresponding to one of the scrambling codes to the network device.

For example, if multiple PTM transmissions are received by the terminal in multiple time slots, for any two PTM transmissions that occur in different time slots, if different PTM-RNTIs are used to scramble DCIs scheduling the two PTM transmissions, the terminal only feeds back one PTM transmission scheduled by a DCI scrambled with one PTM-RNTI.

For any two PTM transmissions indicated by the network device, if different PTM-RNTIs are used to scramble DCIs scheduling the two PTM transmissions, it is undesirable for the terminal that UL resources indicated by the network device for HARQ-ACK information of the two PTM transmissions overlap in time domain.

It can be seen that, in this example, the terminal does not need to feed back HARQ-ACK information of multiple pieces of PTM transmission information, which is beneficial to reducing the complexity of generating a HARQ-ACK codebook and the amount of information fed back.

In a possible example, the preset information includes multiple pieces of PTM transmission information, and the terminal feeds back the HARQ response information of the preset information to the network device as follows. The terminal feeds back HARQ response information of the multiple pieces of PTM transmission information to the network device by using a same UL resource.

It can be seen that, in this example, the terminal can feed back HARQ-ACK information of all PTM transmission information to the network device in a same UL resource, which is beneficial to improving the reliability and resource utilization of PTM transmission of information.

In a possible example, if the multiple pieces of PTM transmission information are received by the terminal in multiple time slots, the terminal feeds back the HARQ response information of the multiple pieces of PTM transmission information to the network device by using the same UL resource as follows. If a same UL resource is used for the HARQ response information of the multiple pieces of PTM transmission information, and a same scrambling code is used for DCIs scheduling the multiple pieces of PTM transmission information, the terminal feeds back the HARQ response information of all PTM transmission information to the network device by using the UL resource.

For example, for multiple PTM transmissions indicated by the network device that occur in different time slots, if a same PTM-RNTI is used to scramble DCIs scheduling the multiple PTM transmissions, and a same UL resource is used for HARQ-ACK information corresponding to the multiple PTM transmissions indicated by the network device, the terminal feeds back the HARQ-ACK information of all PTM transmissions on the UL resource.

It can be seen that, in this example, the terminal can feed back the HARQ-ACK information of all PTM transmission information to the network device on the same UL resource, which is beneficial to improving the reliability and resource utilization of PTM transmission of information.

In a possible example, the terminal feeds back the HARQ response information of all PTM transmission information to the network device by using the UL resource as follows. The terminal feeds back the HARQ response information of all PTM transmission information to the network device by using a first type of HARQ response information codebook or a second type of HARQ response information codebook according to a configuration of the network device.

For example, the terminal can feed back HARQ-ACK information of multiple PTM transmissions by using the first type of HARQ response information codebook (type-1 HARQ-ACK codebook) defined in the 3rd generation partnership project (3GPP) protocol or the second type of HARQ response information codebook (type-2 HARQ-ACK codebook) defined in the 3GPP protocol according to the configuration of the network device.

It can be seen that, in this example, the terminal can select multiple types of HARQ-ACK codebooks to feed back HARQ-ACK information to the network device, which is beneficial to improving the resource utilization.

In a possible example, if the terminal feeds back the HARQ response information of all PTM transmission information to the network device by using the second type of HARQ response information codebook, downlink assignment index (DAI) bit fields carried in DCIs scrambled with a same scrambling code are independently counted.

For example, if the type-2 HARQ-ACK codebook is selected, the terminal considers that DAI bit fields carried in DCIs scrambled with a same PTM-RNTI are independently counted.

In a possible example, if the multiple pieces of PTM transmission information are received by the terminal in multiple time slots, the terminal feeds back the HARQ response information of the multiple pieces of PTM transmission information by using the same UL resource as follows. If a same UL resource is used for the HARQ response information of the multiple pieces of PTM transmission information, and scrambling codes used for DCIs scheduling the multiple pieces of PTM transmission information are partially the same, the terminal feeds back the HARQ response information of all PTM transmission information to the network device by using the UL resource.

For example, for multiple PTM transmissions indicated by the network device that occur in different time slots, if a same UL resource is used for HARQ-ACK information corresponding to the multiple PTM transmissions indicated by the network device, the terminal feeds back HARQ-ACK information of all the PTM transmissions on the UL resource.

It can be seen that, in this example, the terminal can feed back HARQ-ACK information of the multiple pieces of PTM transmission information on the same UL resource, thereby avoiding retransmission of the PTM transmission information due to limited UL resources, which is beneficial to improving the reliability and resource utilization of PTM transmission of information.

In a possible example, the terminal feeds back the HARQ response information of all PTM transmission information to the network device by using the UL resource as follows. The terminal feeds back the HARQ response information of all PTM transmission information to the network device by using a first type of HARQ response information codebook or a second type of HARQ response information codebook according to a configuration of the network device.

For example, the terminal can feed back HARQ-ACK information of all PTM transmissions by using the first type of HARQ response information codebook (type-1 HARQ- ACK codebook) defined in the 3GPP protocol or the second type of HARQ response information codebook (type-2 HARQ-ACK codebook) defined in the 3GPP protocol according to the configuration of the network device.

In a possible example, if the terminal feeds back the HARQ response information of all PTM transmission information to the network device by using the second type of HARQ response information codebook, DAI bit fields carried in DCIs scrambled with different scrambling codes are independently counted.

For example, for the type-2 HARQ-ACK codebook, DAI bit fields carried in DCIs scrambled with different PTM-RNTIs are independently counted.

In a possible example, a set of values of a first interval between a time slot where the multiple pieces of PTM transmission information are located and a time slot where the UL resource is located is configured by the network device according to the scrambling codes.

For example, for the type-1 HARQ-ACK codebook or the type-2 HARQ-ACK codebook, a set of possible values of an interval between a time slot where PTM transmission is located and a time slot where a resource for UL feedback is located is configured by the network device according to PTM-RNTIs. That is, for different PTM-RNTIs, the set of values of the interval between the time slot where the PTM transmission is located and the time slot where the UL feedback is located may be different.

It can be seen that, in this example, the set of values of the first interval between the time slot where the multiple pieces of PTM transmission information are located and the time slot where the UL resource is located is configured by the network device according to the scrambling codes, so that the set of values of the first interval can be flexibly configured, which is beneficial to improving the resource utilization.

In a possible example, the UL resource is used to feed back HARQ response information of at most N pieces of PTM transmission information scheduled by DCIs scrambled with different scrambling codes, and a value of N is preset or configured by the network device.

It can be seen that, in this example, the maximum number of pieces of PTM transmission information corresponding to different scrambling codes that can be fed back on one UL resource can be flexibly configured, which is beneficial to improving the resource utilization.

In a possible example, a HARQ response information codebook is generated as follows. For each of the multiple pieces of PTM transmission information, a HARQ response information codebook corresponding to the PTM transmission information scheduled by a DCI scrambled with a first target scrambling code is generated according to HARQ response information of the PTM transmission information, where the first target scrambling code is one of different scrambling codes. A composite codebook is generated by cascading HARQ response information codebooks corresponding to the multiple pieces of PTM transmission information sequentially according to sizes of the scrambling codes.

Figure 2B:
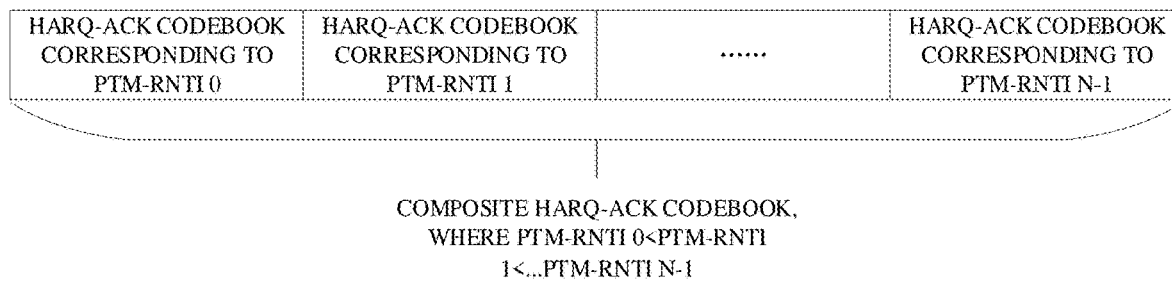
FIG. 2B is a schematic structural diagram of a hybrid automatic repeat request (HARQ) response information codebook provided in embodiments of the disclosure.

Further referring to FIG. 2B, FIG. 2B is a schematic structural diagram of a HARQ response information codebook provided in embodiments of the disclosure. As illustrated in FIG. 2B, for PTM transmissions scheduled by DCIs scrambled with different PTM-RNTIs, when generating a HARQ-ACK codebook of feedback information, a HARQ-ACK codebook of feedback information corresponding to PTM transmissions scheduled by DCIs scrambled with a same PTM-RNTI is first generated separately, and then a final composite codebook is generated by cascading corresponding HARQ-ACK codebooks sequentially according to relative sizes of the PTM-RNTIs.

It can be seen that, in this example, the terminal can feed back HARQ-ACK information of the multiple pieces of PTM transmission information on the same UL resource, thereby avoiding retransmission of the PTM transmission information due to limited UL resources, which is beneficial to improving the reliability and resource utilization of PTM transmission of information.

In a possible example, the preset information includes one or more pieces of PTM transmission information and one or more pieces of unicast transmission information, and the terminal feeds back the HARQ response information of the preset information to the network device as follows. The terminal feeds back HARQ response information of the one or more pieces of PTM transmission information and HARQ response information of the one or more pieces of unicast transmission information to the network device by using different orthogonal UL resources.

It can be seen that, in this example, the terminal can avoid feeding back HARQ-ACK information of PTM transmission information and HARQ-ACK information of unicast transmission information on the same UL resource, which is beneficial to reducing the complexity of the implementation of the terminal.

In a possible example, the terminal feeds back the HARQ response information of the one or more pieces of PTM transmission information and the HARQ response information of the one or more pieces of unicast transmission information by using the different orthogonal UL resources as follows. If a UL resource for the HARQ response information of the one or more pieces of PTM transmission information and a UL resource for the HARQ response information of the one or more pieces of unicast transmission information overlap in time domain, the terminal feeds back the HARQ response information of the one or more pieces of PTM transmission information or the HARQ response information of the one or more unicast transmission information to the network device.

For example, when a UL resource for HARQ-ACK information corresponding to one or more PTM transmissions and a UL resource for HARQ-ACK information corresponding to one or more unicast transmissions indicated by the network device overlap in time domain, the terminal only feeds back the HARQ-ACK information of the PTM transmission or the HARQ-ACK information of the unicast transmission.

It is undesirable for the terminal that the UL resource for HARQ-ACK information corresponding to one or more PTM transmissions and the UL resource for HARQ-ACK information corresponding to one or more unicast transmissions indicated by the network device overlap in time.

It can be seen that, in this example, when the UL resource for the HARQ-ACK information of the PTM transmission information and the UL resource for the HARQ-ACK information of the unicast transmission overlap in time domain, the terminal only feeds back the HARQ-ACK information of the PTM transmission information or the HARQ-ACK information of the unicast transmission, thereby preventing the terminal from feeding back the HARQ-ACK information of the PTM transmission information and the HARQ-ACK information of the unicast transmission information on the same UL resource, which is beneficial to reducing the complexity of the implementation of the terminal.

In a possible example, the HARQ response information fed back is determined by the terminal according to an implementation of the terminal, an order of start time of transmission of DCIs corresponding to the one or more pieces of PTM transmission information and the one or more pieces of unicast transmission information, or priorities of the one or more pieces of PTM transmission information and the one or more pieces of unicast transmission information.

For example, if a UL resource for HARQ-ACK information corresponding to one or more PTM transmissions and a UL resource for HARQ-ACK information corresponding to one or more unicast transmissions indicated by the network device overlap in time, the terminal can select HARQ-ACK information to feed back according to one of the following rules.

(1) The terminal determines HARQ-ACK information to feed back according to an implementation of the terminal.

(2) The terminal feeds back HARQ-ACK information corresponding to transmission scheduled by a DCI having the latest start time. For example, if transmission of a DCI of a last unicast transmission of HARQ-ACK information fed back in UL time slot m starts at time slot n, transmission of a DCI scheduling PTM of HARQ-ACK information fed back in UL time slot m starts at time slot n+1, and UL resources for the two pieces of HARQ-ACK information fed back overlap on time slot m, the terminal only feeds back the HARQ-ACK information of the PTM transmitted in time slot n+1.

(3) The terminal feeds back HARQ-ACK information of a transmission with a higher priority. The priority of the PTM transmission is indicated via a DCI scheduling the PTM transmission. For example, if the PTM transmission carries a V2X service and the PPPP of the PTM transmission is less than a specific threshold configured by the network device, the terminal feeds back the HARQ-ACK information of the PTM transmission, otherwise, the terminal feeds back the HARQ-ACK information of the unicast transmission.

It can be seen that, in this example, the terminal can determine the specific HARQ response information of transmission information to feed back to the network device according to the implementation of the terminal, the order of start time of transmission of DCIs corresponding to the one or more pieces of PTM transmission information and the one or more pieces of unicast transmission information, or the priorities of the one or more pieces of PTM transmission information and the one or more pieces of unicast transmission information, which is beneficial to providing the terminal with multiple criteria for selecting HARQ-ACK information to feed back.

In a possible example, the preset information includes one or more pieces of PTM transmission information and one or more pieces of unicast transmission information, and the terminal feeds back the HARQ response information of the preset information to the network device as follows. The terminal feeds back HARQ response information of the one or more pieces of PTM transmission information and HARQ response information of the one or more pieces of unicast transmission information to the network device by using a same UL resource.

It can be seen that, in this example, the terminal can simultaneously feed back HARQ-ACK feedback information of the unicast transmission information and HARQ-ACK feedback information of the PTM transmission information on the same UL resource, thereby avoiding retransmission of the PTM transmission information or the unicast transmission information due to limited UL resources, which is beneficial to improving the reliability and resource utilization of the communication system.

In a possible example, the terminal feeds back the HARQ response information of the one or more pieces of PTM transmission information and the HARQ response information of the one or more pieces of unicast transmission information to the network device by using the same UL resource as follows. If a same UL resource is used for the HARQ response information of the one or more pieces of PTM transmission information and the HARQ response information of the one or more pieces of unicast transmission information, the terminal feeds back the HARQ response information of the one or more pieces of PTM transmission information and the HARQ response information of the one or more pieces of unicast transmission information to the network device by using the UL resource.

For example, for one or more PTM transmissions and one or more unicast transmissions indicated by the network device, if a same UL resource is used for HARQ-ACK information corresponding to the one or more PTM transmissions and HARQ-ACK information corresponding to the one or more unicast transmissions, the terminal simultaneously feeds back the HARQ-ACK information of the one or more PTM transmissions and the HARQ-ACK information of the one or more unicast transmissions on the UL resource.

It can be seen that, in this example, the terminal can simultaneously feed back HARQ-ACK feedback information of the unicast transmission information and HARQ-ACK feedback information of the PTM transmission information on the same UL resource, thereby avoiding retransmission of the PTM transmission information or the unicast transmission information due to limited UL resources, which is beneficial to improving the reliability and resource utilization of the communication system.

In a possible example, the terminal feeds back the HARQ response information of the one or more pieces of PTM transmission information and the HARQ response information of the one or more pieces of unicast transmission information to the network device by using the UL resource as follows. The terminal feeds back the HARQ response information of the one or more pieces of PTM transmission information and the HARQ response information of the one or more pieces of unicast transmission information by using a first type of HARQ response information codebook or a second type of HARQ response information codebook according to a configuration of the network device.

For example, the terminal can feed back HARQ-ACK information of one or more PTM transmissions by using the type-1 HARQ-ACK codebook or the type-2 HARQ-ACK codebook according to the configuration of the network device. The terminal can feed back HARQ-ACK information of one or more unicast transmissions by using the type-1 HARQ-ACK codebook or the type-2 HARQ-ACK codebook according to the configuration of the network device.

A same type of HARQ-ACK codebook or different types of HARQ-ACK codebooks may be fed back on a same UL resource for one or more PTM transmissions and one or more unicast transmissions.

In a possible example, if the terminal feeds back the HARQ response information of the one or more pieces of PTM transmission information and the HARQ response information of the one or more pieces of unicast transmission information to the network device by using the second type of HARQ response information codebook, DAI bit fields carried in a DCI scheduling the one or more pieces of PTM transmission information and DAI bit fields carried in a DCI scheduling the one or more pieces of unicast transmission information are independently counted.

For example, for the type-2 HARQ-ACK codebook, DAI bit fields carried in a DCI scheduling PTM transmission and DAI bit fields carried in a DCI scheduling unicast transmission are independently counted.

In a possible example, a set of values of a second interval between a time slot where the one or more pieces of PTM transmission information are located and a time slot where the UL resource is located, and a set of values of a third interval between a time slot where the one or more pieces of unicast transmission information are located and the time slot where the UL resource is located are respectively configured by the network device.

For example, for the type-1 HARQ-ACK codebook or the type-2 HARQ-ACK codebook, a set of possible values of an interval between a time slot where PTM transmission is located and a time slot where the UL resource is located and a set of possible values of an interval between a time slot where unicast transmission is located and the time slot where the UL resource is located are respectively configured by the network device. That is, the set of values of the interval between the time slot where the PTM transmission is located and the time slot where the UL resource is located may be different from the set of values of the interval between the time slot where the unicast transmission is located and the time slot where the UL resource is located.

In a possible example, the UL resource is used to feed back HARQ response information of at most N pieces of PTM transmission information scheduled by DCIs scrambled with different scrambling codes, and a value of N is preset or configured by the network device.

For example, on a same UL resource, the terminal can feed back at most PTM transmissions scheduled by DCIs scrambled with N different PTM-RNTIs, where a value of N is defined by the standard or configured by the network device.

In a possible example, a HARQ response information codebook is generated as follows. HARQ response information codebooks corresponding to the one or more pieces of PTM transmission information are generated respectively. HARQ response information codebooks corresponding to the one or more pieces of unicast transmission information are generated respectively. A composite codebook is generated by cascading the HARQ response information codebooks corresponding to the one or more pieces of PTM transmission information and the HARQ response message codebooks corresponding to the one or more pieces of unicast transmission information.

Figure 2C:
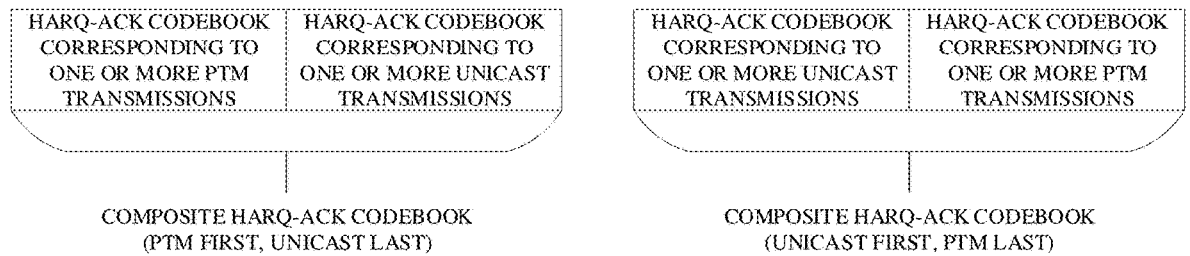
FIG. 2C is a schematic structural diagram of another HARQ response information codebook provided in embodiments of the disclosure.

Further referring to FIG. 2C, FIG. 2C is a schematic structural diagram of another HARQ response information codebook provided in embodiments of the disclosure. As illustrated in FIG. 2C, for one or more PTM transmissions and one or more unicast transmissions whose HARQ-ACK information is fed back on a same UL resource, when generating a HARQ-ACK codebook, HARQ-ACK codebooks for one or more PTM transmissions and HARQ-ACK codebooks for one or more unicast transmissions are first separately generated, a final composite codebook is generated by cascading corresponding HARQ-ACK codebooks in an order of PTM transmission codebooks first, unicast transmission codebooks last, or in a reverse order.

It can be seen that, in this example, the terminal can simultaneously feed back HARQ-ACK feedback information of the unicast transmission information and HARQ-ACK feedback information of the PTM transmission information on the same UL resource, thereby avoiding retransmission of the PTM transmission information or the unicast transmission information due to limited UL resources, which is beneficial to improving the reliability and resource utilization of the communication system.

In a possible example, the terminal feeds back the HARQ response information of the preset information to the network device as follows. If a DCI scheduling the PTM transmission information contains information of a target geographic location range for the PTM transmission information, the terminal feeds back the HARQ response information of the PTM transmission information to the network device when the terminal is located in the target geographic location range.

For example, for a certain PTM transmission, if a DCI scheduling the PTM transmission indicates a geographic location range for the PTM transmission, the terminal feeds back HARQ-ACK information of the PTM transmission on a specific UL resource only when the terminal is located in the geographic location range.

It can be seen that, in this example, the terminal can feed back HARQ-ACK information of transmission information according to a geographic location of the terminal, which is beneficial to reducing the complexity of the communication system and improving the resource utilization.

In a possible example, the terminal feeds back the HARQ response information of the PTM transmission information to the network device when the terminal is located in the target geographic location range as follows. The terminal feeds back the HARQ response information of the PTM transmission information to the network device by using a first target UL resource when the terminal is located in the target geographic location range, where the first target UL resource is indicated by the network device, and the first target UL resource is used for all terminals receiving the PTM transmission information to feed back the HARQ response information of the PTM transmission information.

For example, the network device indicates that all receiving terminals of a certain PTM transmission feed back HARQ-ACK information of the PTM transmission on a specific UL resource, or the network device indicates that a receiving terminal of the PTM transmission located in a specific network zone feeds back the HARQ-ACK information of the PTM transmission by using a specific UL resource, and a receiving terminal located in a different network zone may feed back the HARQ-ACK information by using a different UL resource. The terminal determines a location in time domain, frequency domain, and code domain of a UL resource for feeding back the HARQ-ACK information according to an identity (ID) of a zone where the terminal is located.

It can be seen that, in this example, the terminal feeds back the HARQ-ACK information of the PTM transmission information on a shared UL resource for HARQ-ACK information only when the terminal is located in a specific geographic location range.

In a possible example, a coverage of the network device is divided into multiple zones each corresponding to an ID, the information of the target geographic location range includes a reference zone ID and an effective distance, and the method further includes the following. The terminal determines a reference zone according to the reference zone ID. The terminal determines a range within an effective distance from a center or an edge of the reference zone as the target geographic location range.

For example, for a certain PTM transmission, the network device indicates the reference zone ID and the effective distance in a DCI, and the range within the effective distance from the center or the edge of the reference zone is the geographic range for the PTM transmission. The effective distance can be denoted as the number of zones or an index corresponding to an absolute distance. Optionally, the index corresponding to the absolute distance is configured via higher layer signaling.

Figure 2D:
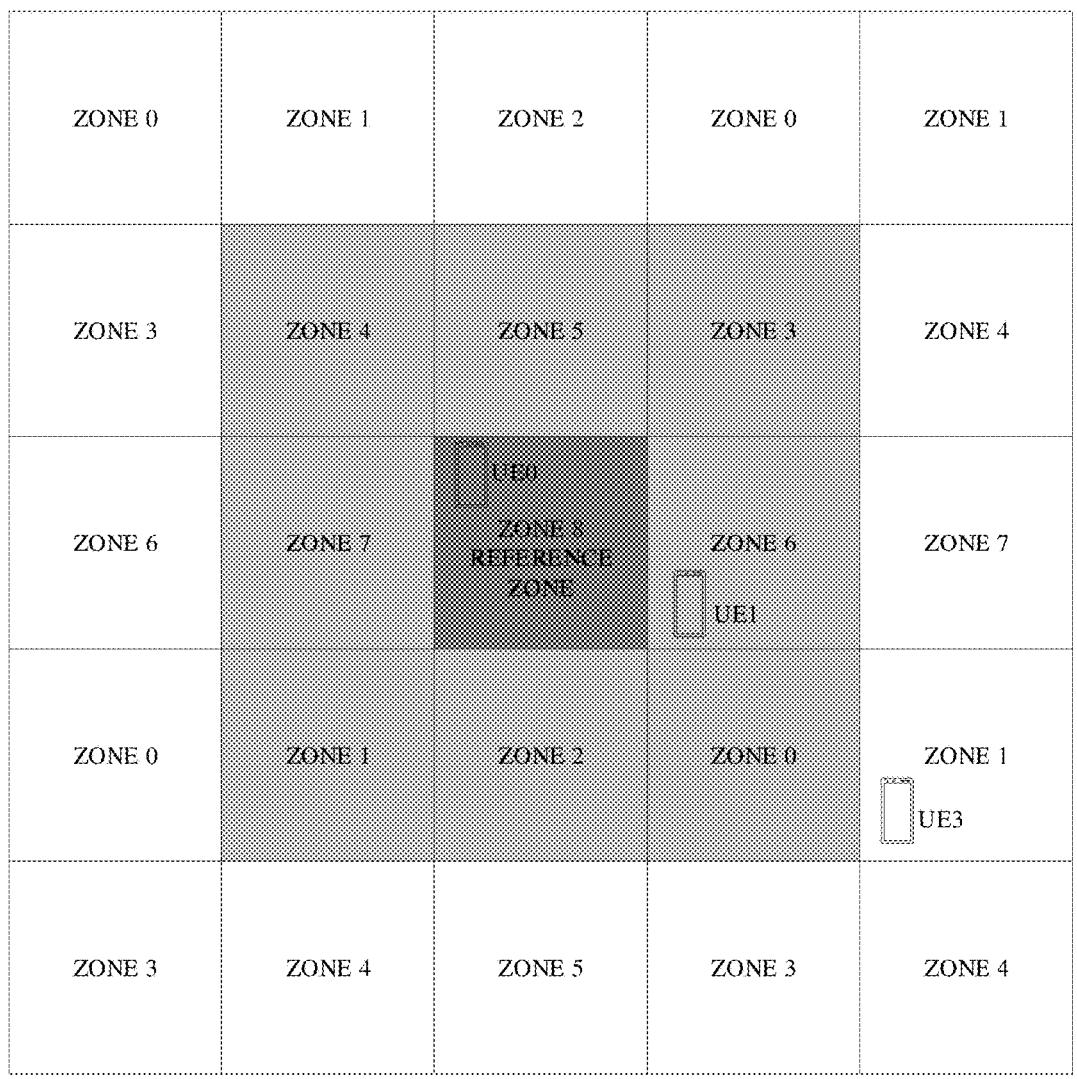
FIG. 2D is a schematic diagram of feedback of HARQ response information based on a geographic location range provided in embodiments of the disclosure.

Further referring to FIG. 2D, FIG. 2D is a schematic diagram of feedback of HARQ response information based on a geographic location range provided in embodiments of the disclosure. As illustrated in FIG. 2D, if the reference zone indicated by the network device is zone 8, the effective distance is one zone, then only a terminal located in zone 8 (a dark gray part in FIG. 2D) and an area that is only one zone from zone 8 (a light gray part in FIG. 2D) need to feed back HARQ-ACK information of the PTM transmission. For example, UE 0 and UE 1 need to feed back the HARQ-ACK information of the PTM transmission, but UEs in other zones, such as UE 3, does not need to feed back the HARQ-ACK information of the PTM transmission.

In a possible example, each scrambling code corresponds to a geographic location range, each scrambling code corresponds to a second target UL resource, a correspondence between scrambling codes and geographic location ranges and a correspondence between scrambling codes and second target UL resources are indicated by the network device, and the terminal feeds back the HARQ response information of the preset information to the network device as follows. The terminal determines the target geographic location range and a second target UL resource according to a scrambling code used for the DCI scheduling the PTM transmission information. The terminal feeds back the HARQ response information of the PTM transmission information to the network device by using the second target UL resource when the terminal is located in the target geographic location range.

For example, the geographic location range can be indirectly indicated via a PTM-RNTI. That is, each PTM-RNTI corresponds to a specific geographic range. A correspondence between PTM-RNTIs and geographic ranges is configured by the network device via RRC layer signaling. The network device simultaneously indicates HARQ-ACK UL resources corresponding to all PTM-RNTIs. In this case, the terminal only detects a DCI scrambled with a PTM-RNTI corresponding to a current geographic location, and feeds back the HARQ-ACK information of the PTM transmission on a UL resource corresponding to the PTM-RNTI according to a reception result of the PTM transmission scheduled by the DCI. In this case, the terminal reports geographic location information of the terminal according to a certain period or an indication of the network device.

In a possible example, the terminal feeds back the HARQ response information of the PTM transmission information to the network device when the terminal is located in the target geographic location range as follows. The terminal feeds back the HARQ response information of the PTM transmission information to the network device by using a third target UL resource when the terminal is located in the target geographic location range, where the third target UL resource is indicated by the network device, and the third target UL resource is used for all terminals receiving the PTM transmission information within the target geographic location range to feed back the HARQ response information of the PTM transmission information to the network device.

For example, for a certain PTM transmission, if a DCI scheduling the PTM transmission indicates a geographic range for the transmission, and the network device indicates that a receiving terminal of the PTM transmission feeds back the HARQ-ACK information of the PTM transmission on a dedicated UL resource, the terminal feeds back the HARQ-ACK information of the PTM transmission on the dedicated UL resource of the terminal according to a reception result only when the terminal is located in the geographic range. That is, if the terminal receives the PTM transmission correctly, the terminal feeds back an ACK, otherwise, the terminal feeds back a NACK. A terminal located outside the geographic range feeds back an ACK on a UL feedback resource of the terminal.

It can be seen that, in this example, the terminal feeds back the HARQ-ACK information of the PTM transmission information on a dedicated UL resource for HARQ-ACK information only when the terminal is located in a specific geographic location range.

In a possible example, the method further includes the following. The terminal feeds back geographic location information of the terminal to the network device according to a preset period or an indication of the network device. The terminal receives RRC information from the network device. The terminal determines a second target scrambling code and a fourth target UL resource according to the RRC information. The terminal receives target PTM transmission information scheduled by a second target DCI when the second target DCI scrambled with the second target scrambling code is received. The terminal feeds back HARQ response information of the target PTM transmission information to the network device by using the fourth target UL resource.

For example, the terminal reports geographic location information of the terminal according to a certain period or an indication of the network device, and receives a network device-specific RRC message to determine a PTM-RNTI to detect and a corresponding dedicated HARQ-ACK UL resource. The terminal only detects DCIs scrambled with one or more PTM-RNTIs configured by the network device, and feeds back an ACK or a NACK on a corresponding dedicated UL resource for HARQ-ACK information according to a reception result of the PTM transmission scheduled by the DCIs.

It can be seen that, in this example, the terminal can report the geographic location information to the network device, and the terminal feeds back the HARQ-ACK information of the PTM transmission information on a dedicated UL resource for HARQ-ACK information only when the terminal is located in a specific geographic location range.

Figure 3:
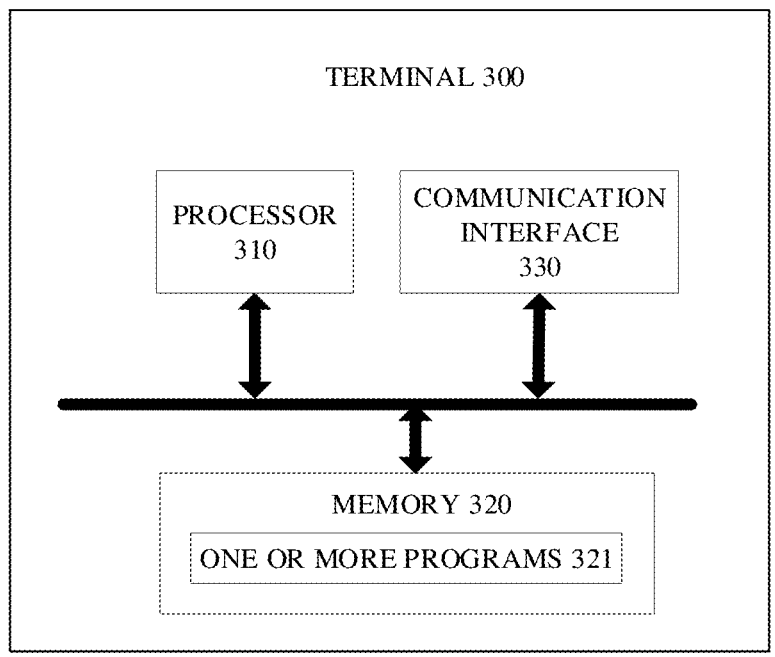
FIG. 3 is a schematic structural diagram of a terminal provided in embodiments of the disclosure.

Consistent with embodiments illustrated in FIG. 2A, referring to FIG. 3, FIG. 3 is a schematic structural diagram of a terminal 300 provided in embodiments of the disclosure. As illustrated in FIG. 3, the terminal 300 includes a processor 310, a memory 320 configured to store one or more programs 321, and a communication interface 330. The one or more programs 321 are configured to be executed by the processor 310 and include instructions configured to perform the following. A terminal receives preset information from a network device, where the preset information at least includes PTM transmission information. The terminal feeds back HARQ response information of the preset information to the network device, where the HARQ response information includes HARQ response information of the PTM transmission information.

It can be seen that, in embodiments of the disclosure, the terminal receives the preset information from the network device, where the preset information at least includes the PTM transmission information, and the terminal feeds back the HARQ response information of the preset information to the network device, where the HARQ response information includes the HARQ response information of the PTM transmission information. It can be seen that, in the disclosure, there is a HARQ feedback mechanism when the terminal receives the PTM transmission information. When service data of PTM transmission is lost, the network device can determine whether a retransmission needs to be transmitted according to HARQ feedback information, which is beneficial to ensuring the reliability of service data transmission.

In a possible example, in terms of receiving by the terminal the preset information from the network device, the program 321 specifically includes instructions configured to perform the following. The terminal receives a DCI scheduling the preset information from the network device. The terminal receives the preset information according to indication information in the DCI.

In a possible example, the program 321 further includes instructions configured to perform the following. The terminal determines a UL resource for the HARQ response information of the preset information according to the indication information in the DCI.

In a possible example, the preset information includes multiple pieces of PTM transmission information, and in terms of feeding back by the terminal the HARQ response information of the preset information to the network device, the program 321 specifically includes instructions configured to perform the following. The terminal feeds back HARQ response information of the multiple pieces of PTM transmission information to the network device by using different orthogonal UL resources.

In a possible example, if the multiple pieces of PTM transmission information are received by the terminal in multiple time slots, in terms of feeding back by the terminal the HARQ response information of the multiple pieces of PTM transmission information to the network device by using the different orthogonal UL resources, the program 321 specifically includes instructions configured to perform the following. If UL resources for the HARQ response information of the multiple pieces of PTM transmission information overlap in time domain, and the multiple pieces of PTM transmission information each transmit different TBs, the terminal feeds back HARQ response information of PTM transmission information in one of the time slots to the network device.

In a possible example, the HARQ response information of the PTM transmission information in the one of the time slots is determined by the terminal according to an implementation of the terminal, an order of start time of transmission of DCIs corresponding to the multiple pieces of PTM transmission information, or priorities of the multiple pieces of PTM transmission information.

In a possible example, if the multiple pieces of PTM transmission information are received by the terminal in multiple time slots, in terms of feeding back by the terminal the HARQ response information of the multiple pieces of PTM transmission information to the network device by using the different orthogonal UL resources, the program 321 specifically includes instructions configured to perform the following. If different scrambling codes are used for DCIs scheduling the multiple pieces of PTM transmission information, the terminal feeds back HARQ response information of one of the multiple pieces of PTM transmission information scheduled by a DCI corresponding to one of the scrambling codes to the network device.

In a possible example, the preset information includes multiple pieces of PTM transmission information, in terms of feeding back by the terminal the HARQ response information of the preset information to the network device, the program 321 specifically includes instructions configured to perform the following. The terminal feeds back HARQ response information of the multiple pieces of PTM transmission information to the network device by using a same UL resource.

In a possible example, if the multiple pieces of PTM transmission information are received by the terminal in multiple time slots, in terms of feeding back by the terminal the HARQ response information of the multiple pieces of PTM transmission information to the network device by using the same UL resource, the program 321 specifically includes instructions configured to perform the following. If a same UL resource is used for the HARQ response information of the multiple pieces of PTM transmission information, and a same scrambling code is used for DCIs scheduling the multiple pieces of PTM transmission information, the terminal feeds back the HARQ response information of all PTM transmission information to the network device by using the UL resource.

In a possible example, in terms of feeding back by the terminal the HARQ response information of all PTM transmission information to the network device by using the UL resource, the program 321 specifically includes instructions configured to perform the following. The terminal feeds back the HARQ response information of all PTM transmission information to the network device by using a first type of HARQ response information codebook or a second type of HARQ response information codebook according to a configuration of the network device.

In a possible example, if the terminal feeds back the HARQ response information of all PTM transmission information to the network device by using the second type of HARQ response information codebook, DAI bit fields carried in DCIs scrambled with a same scrambling code are independently counted.

In a possible example, if the multiple pieces of PTM transmission information are received by the terminal in multiple time slots, in terms of feeding back by the terminal the HARQ response information of the multiple pieces of PTM transmission information by using the same UL resource, the program 321 specifically includes instructions configured to perform the following. If a same UL resource is used for the HARQ response information of the multiple pieces of PTM transmission information, and scrambling codes used for DCIs scheduling the multiple pieces of PTM transmission information are partially the same, the terminal feeds back the HARQ response information of all PTM transmission information to the network device by using the UL resource.

In a possible example, in terms of feeding back by the terminal the HARQ response information of all PTM transmission information to the network device by using the UL resource, the program 321 specifically includes instructions configured to perform the following. The terminal feeds back the HARQ response information of all PTM transmission information to the network device by using a first type of HARQ response information codebook or a second type of HARQ response information codebook according to a configuration of the network device.

In a possible example, if the terminal feeds back the HARQ response information of all PTM transmission information to the network device by using the second type of HARQ response information codebook, DAI bit fields carried in DCIs scrambled with different scrambling codes are independently counted.

In a possible example, a set of values of a first interval between a time slot where the multiple pieces of PTM transmission information are located and a time slot where the UL resource is located is configured by the network device according to the scrambling codes.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. For each of the multiple pieces of PTM transmission information, a HARQ response information codebook corresponding to the PTM transmission information scheduled by a DCI scrambled with a first target scrambling code is generated according to HARQ response information of the PTM transmission information, where the first target scrambling code is one of different scrambling codes. A composite codebook is generated by cascading HARQ response information codebooks corresponding to the multiple pieces of PTM transmission information sequentially according to sizes of the scrambling codes.

In a possible example, the preset information includes one or more pieces of PTM transmission information and one or more pieces of unicast transmission information, in terms of feeding back by the terminal the HARQ response information of the preset information to the network device, the program 321 specifically includes instructions configured to perform the following. The terminal feeds back HARQ response information of the one or more pieces of PTM transmission information and HARQ response information of the one or more pieces of unicast transmission information to the network device by using different orthogonal UL resources.

In a possible example, in terms of feeding back by the terminal the HARQ response information of the one or more pieces of PTM transmission information and the HARQ response information of the one or more pieces of unicast transmission information by using the different orthogonal UL resources, the program 321 specifically includes instructions configured to perform the following. If a UL resource for the HARQ response information of the one or more pieces of PTM transmission information and a UL resource for the HARQ response information of the one or more pieces of unicast transmission information overlap in time domain, the terminal feeds back the HARQ response information of the one or more pieces of PTM transmission information or the HARQ response information of the one or more unicast transmission information to the network device.

In a possible example, the HARQ response information fed back is determined by the terminal according to an implementation of the terminal, an order of start time of transmission of DCIs corresponding to the one or more pieces of PTM transmission information and the one or more pieces of unicast transmission information, or priorities of the one or more pieces of PTM transmission information and the one or more pieces of unicast transmission information.

In a possible example, the preset information includes one or more pieces of PTM transmission information and one or more pieces of unicast transmission information, and in terms of feeding back by the terminal the HARQ response information of the preset information to the network device, the program 321 specifically includes instructions configured to perform the following. The terminal feeds back HARQ response information of the one or more pieces of PTM transmission information and HARQ response information of the one or more pieces of unicast transmission information to the network device by using a same UL resource.

In a possible example, in terms of feeding back by the terminal the HARQ response information of the one or more pieces of PTM transmission information and the HARQ response information of the one or more pieces of unicast transmission information to the network device by using the same UL resource, the program 321 specifically includes instructions configured to perform the following. If a same UL resource is used for the HARQ response information of the one or more pieces of PTM transmission information and the HARQ response information of the one or more pieces of unicast transmission information, the terminal feeds back the HARQ response information of the one or more pieces of PTM transmission information and the HARQ response information of the one or more pieces of unicast transmission information to the network device by using the UL resource.

In a possible example, in terms of feeding back by the terminal the HARQ response information of the one or more pieces of PTM transmission information and the HARQ response information of the one or more pieces of unicast transmission information to the network device by using the UL resource, the program 321 specifically includes instructions configured to perform the following. The terminal feeds back the HARQ response information of the one or more pieces of PTM transmission information and the HARQ response information of the one or more pieces of unicast transmission information by using a first type of HARQ response information codebook or a second type of HARQ response information codebook according to a configuration of the network device.

In a possible example, if the terminal feeds back the HARQ response information of the one or more pieces of PTM transmission information and the HARQ response information of the one or more pieces of unicast transmission information to the network device by using the second type of HARQ response information codebook, DAI bit fields carried in a DCI scheduling the one or more pieces of PTM transmission information and DAI bit fields carried in a DCI scheduling the one or more pieces of unicast transmission information are independently counted.

In a possible example, a set of values of a second interval between a time slot where the one or more pieces of PTM transmission information are located and a time slot where the UL resource is located, and a set of values of a third interval between a time slot where the one or more pieces of unicast transmission information are located and the time slot where the UL resource is located are respectively configured by the network device.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. HARQ response information codebooks corresponding to the one or more pieces of PTM transmission information are generated respectively. HARQ response information codebooks corresponding to the one or more pieces of unicast transmission information are generated respectively. A composite codebook is generated by cascading the HARQ response information codebooks corresponding to the one or more pieces of PTM transmission information and the HARQ response message codebooks corresponding to the one or more pieces of unicast transmission information.

In a possible example, in terms of feeding back by the terminal the HARQ response information of the preset information to the network device, the program 321 specifically includes instructions configured to perform the following. If a DCI scheduling the PTM transmission information contains information of a target geographic location range for the PTM transmission information, the terminal feeds back the HARQ response information of the PTM transmission information to the network device when the terminal is located in the target geographic location range.

In a possible example, in terms of feeding back by the terminal the HARQ response information of the PTM transmission information to the network device when the terminal is located in the target geographic location range, the program 321 specifically includes instructions configured to perform the following. The terminal feeds back the HARQ response information of the PTM transmission information to the network device by using a first target UL resource when the terminal is located in the target geographic location range, where the first target UL resource is indicated by the network device, and the first target UL resource is used for all terminals receiving the PTM transmission information to feed back the HARQ response information of the PTM transmission information.

In a possible example, a coverage of the network device is divided into multiple zones each corresponding to an ID, the information of the target geographic location range includes a reference zone ID and an effective distance, and the program 321 further includes instructions configured to perform the following. The terminal determines a reference zone according to the reference zone ID. The terminal determines a range within an effective distance from a center or an edge of the reference zone as the target geographic location range.

In a possible example, each scrambling code corresponds to a geographic location range, each scrambling code corresponds to a second target UL resource, a correspondence between scrambling codes and geographic location ranges and a correspondence between scrambling codes and second target UL resources are indicated by the network device, and in terms of feeding back by the terminal the HARQ response information of the preset information to the network device, the program 321 specifically includes instructions configured to perform the following. The terminal determines the target geographic location range and a second target UL resource according to a scrambling code used for the DCI scheduling the PTM transmission information. The terminal feeds back the HARQ response information of the PTM transmission information to the network device by using the second target UL resource when the terminal is located in the target geographic location range.

In a possible example, in terms of feeding back by the terminal the HARQ response information of the PTM transmission information to the network device when the terminal is located in the target geographic location range, the program 321 specifically includes instructions configured to perform the following. The terminal feeds back the HARQ response information of the PTM transmission information to the network device by using a third target UL resource when the terminal is located in the target geographic location range, where the third target UL resource is indicated by the network device, and the third target UL resource is used for all terminals receiving the PTM transmission information within the target geographic location range to feed back the HARQ response information of the PTM transmission information to the network device.

In a possible example, the program 321 further includes instructions configured to perform the following. The terminal feeds back geographic location information of the terminal to the network device according to a preset period or an indication of the network device. The terminal receives RRC information from the network device. The terminal determines a second target scrambling code and a fourth target UL resource according to the RRC information. The terminal receives target PTM transmission information scheduled by a second target DCI when the second target DCI scrambled with the second target scrambling code is received. The terminal feeds back HARQ response information of the target PTM transmission information to the network device by using the fourth target UL resource.

Figure 4:
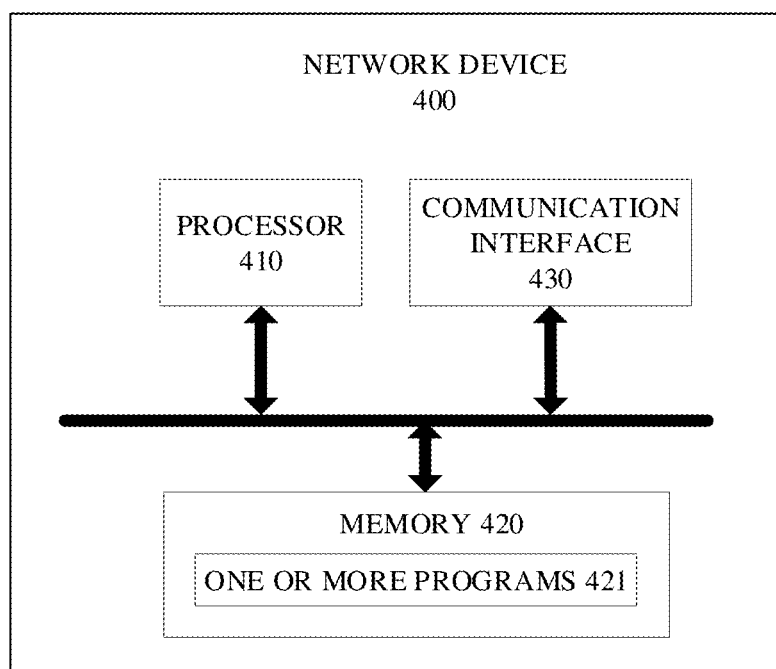
FIG. 4 is a schematic structural diagram of a network device provided in embodiments of the disclosure.

Referring to FIG. 4, FIG. 4 is a schematic structural diagram of a network device 400 provided in embodiments of the disclosure. As illustrated in FIG. 4, the network device 400 includes a processor 410, a memory 420 configured to store one or more programs 421, and a communication interface 430. The one or more programs 421 are configured to be executed by the processor 410 and include instructions configured to perform the following. A network device transmits preset information to a terminal, where the preset information at least includes PTM transmission information. The network device receives HARQ response information of the preset information fed back by the terminal, where the HARQ response information includes HARQ response information of the PTM transmission information.

It can be seen that, in embodiments of the disclosure, the network device transmits the preset information to the terminal, where the preset information at least includes the PTM transmission information. The network device receives the HARQ response information of the preset information fed back by the terminal, where the HARQ response information includes the HARQ response information of the PTM transmission information. It can be seen that, in the disclosure, there is a HARQ feedback mechanism when the network device transmits the PTM transmission information to the terminal. When service data of PTM transmission is lost, the terminal may transmit HARQ feedback information to the network device, and the network device can determine whether a retransmission needs to be transmitted according to the HARQ feedback information, which is beneficial to ensuring the reliability of service data transmission.

In a possible example, in terms of transmitting by the network device the preset information to the terminal, the program 421 specifically includes instructions configured to perform the following. The network device transmits a DCI scheduling the preset information to the terminal, where the DCI is used for the terminal to receive the preset information according to indication information in the DCI.

In a possible example, the DCI is further used for the terminal to determine a UL resource for the HARQ response information of the preset information according to the indication information in the DCI.

In a possible example, the preset information includes multiple pieces of PTM transmission information, and in terms of receiving by the network device the HARQ response information of the preset information fed back by the terminal, the program 421 specifically includes instructions configured to perform the following. The network device receives HARQ response information of the multiple pieces of PTM transmission information fed back by the terminal by using different orthogonal UL resources.

In a possible example, if the network device indicates that the multiple pieces of PTM transmission information are received by the terminal in multiple time slots, in terms of receiving the network device the HARQ response information of the multiple pieces of PTM transmission information fed back by the terminal by using the different orthogonal UL resources, the program 421 specifically includes instructions configured to perform the following. If UL resources for the HARQ response information of the multiple pieces of PTM transmission information overlap in time domain, and the multiple pieces of PTM transmission information each transmit different TBs, the network device receives HARQ response information of PTM transmission information in one of the time slots fed back by the terminal.

In a possible example, the HARQ response information of the PTM transmission information in the one of the time slots is determined by the terminal according to an implementation of the terminal, an order of start time of transmission of DCIs corresponding to the multiple pieces of PTM transmission information, or priorities of the multiple pieces of PTM transmission information.

In a possible example, if the network device indicates that the multiple pieces of PTM transmission information are received by the terminal in multiple time slots, in terms of receiving by the network device the HARQ response information of the multiple pieces of PTM transmission information fed back by the terminal by using the different orthogonal UL resources, the program 421 specifically includes instructions configured to perform the following. If different scrambling codes are used for DCIs scheduling the multiple pieces of PTM transmission information, the network device receives HARQ response information of one of the multiple pieces of PTM transmission information scheduled by a DCI corresponding to one of the scrambling codes fed back by the terminal.

In a possible example, the preset information includes multiple pieces of PTM transmission information, and in terms of receiving by the network device the HARQ response information of the preset information fed back by the terminal, the program 421 specifically includes instructions configured to perform the following. The network device receives HARQ response information of the multiple pieces of PTM transmission information fed back by the terminal by using a same UL resource.

In a possible example, if the network device indicates that the multiple pieces of PTM transmission information are received by the terminal in multiple time slots, in terms of receiving by the network device the HARQ response information of the multiple pieces of PTM transmission information fed back by the terminal by using the same UL resource, the program 421 specifically includes instructions configured to perform the following. If a same UL resource is used for the HARQ response information of the multiple pieces of PTM transmission information, and a same scrambling code is used for DCIs scheduling the multiple pieces of PTM transmission information, the network device receives the HARQ response information of all PTM transmission information fed back by the terminal by using the UL resource.

In a possible example, in terms of receiving by the network device the HARQ response information of all PTM transmission information fed back by the terminal by using the UL resource, the program 421 specifically includes instructions configured to perform the following. The network device receives the HARQ response information of all PTM transmission information fed back by the terminal by using a first type of HARQ response information codebook or a second type of HARQ response information codebook according to a configuration of the network device.

In a possible example, if the network device receives the HARQ response information of all PTM transmission information fed back by the terminal by using the second type of HARQ response information codebook, DAI bit fields carried in DCIs scrambled with a same scrambling code are independently counted.

In a possible example, if the network device indicates that the multiple pieces of PTM transmission information are received by the terminal in multiple time slots, in terms of receiving, by the network device, the HARQ response information of the multiple pieces of PTM transmission information fed back by the terminal by using the same UL resource, the program 421 specifically includes instructions configured to perform the following. If a same UL resource is used for the HARQ response information of the multiple pieces of PTM transmission information, and scrambling codes used for DCIs scheduling the multiple pieces of PTM transmission information are partially the same, the network device receives the HARQ response information of all PTM transmission information fed back by the terminal by using the UL resource.

In a possible example, in terms of receiving by the network device the HARQ response information of all PTM transmission information fed back by the terminal by using the UL resource, the program 421 specifically includes instructions configured to perform the following. The network device receives the HARQ response information of all PTM transmission information fed back by the terminal by using a first type of HARQ response information codebook or a second type of HARQ response information codebook according to a configuration of the network device.

In a possible example, if the network device receives the HARQ response information of all PTM transmission information fed back by the terminal by using the second type of HARQ response information codebook, DAI bit fields carried in DCIs scrambled with different scrambling codes are independently counted.

In a possible example, a set of values of a first interval between a time slot where the multiple pieces of PTM transmission information are located and a time slot where the UL resource is located is configured by the network device according to the scrambling codes.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. For each of the multiple pieces of PTM transmission information, a HARQ response information codebook corresponding to the PTM transmission information scheduled by a DCI scrambled with a first target scrambling code is generated according to HARQ response information of the PTM transmission information, where the first target scrambling code is one of different scrambling codes. A composite codebook is generated by cascading HARQ response information codebooks corresponding to the multiple pieces of PTM transmission information sequentially according to sizes of the scrambling codes.

In a possible example, the preset information includes one or more pieces of PTM transmission information and one or more pieces of unicast transmission information, and in terms of receiving by the network device the HARQ response information of the preset information fed back by the terminal, the program 421 specifically includes instructions configured to perform the following. The network device receives HARQ response information of the one or more pieces of PTM transmission information and HARQ response information of the one or more pieces of unicast transmission information fed back by the terminal by using different orthogonal UL resources.

In a possible example, in terms of receiving by the network device the HARQ response information of the one or more pieces of PTM transmission information and the HARQ response information of the one or more pieces of unicast transmission information fed back by the terminal by using the different orthogonal UL resources, the program 421 specifically includes instructions configured to perform the following. If a UL resource for the HARQ response information of the one or more pieces of PTM transmission information and a UL resource for the HARQ response information of the one or more pieces of unicast transmission information overlap in time domain, the network device receives the HARQ response information of the one or more pieces of PTM transmission information or the HARQ response information of the one or more unicast transmission information fed back by the terminal.

In a possible example, the HARQ response information fed back is determined by the terminal according to an implementation of the terminal, an order of start time of transmission of DCIs corresponding to the one or more pieces of PTM transmission information and the one or more pieces of unicast transmission information, or priorities of the one or more pieces of PTM transmission information and the one or more pieces of unicast transmission information.

In a possible example, the preset information includes one or more pieces of PTM transmission information and one or more pieces of unicast transmission information, and in terms of receiving by the network device the HARQ response information of the preset information fed back by the terminal, the program 421 specifically includes instructions configured to perform the following. The network device receives HARQ response information of the one or more pieces of PTM transmission information and HARQ response information of the one or more pieces of unicast transmission information fed back by the terminal by using a same UL resource.

In a possible example, in terms of receiving by the network device the HARQ response information of the one or more pieces of PTM transmission information and the HARQ response information of the one or more pieces of unicast transmission information fed back by the terminal by using the same UL resource, the program 421 specifically includes instructions configured to perform the following. If a same UL resource is used for the HARQ response information of the one or more pieces of PTM transmission information and the HARQ response information of the one or more pieces of unicast transmission information, the network device receives the HARQ response information of the one or more pieces of PTM transmission information and the HARQ response information of the one or more pieces of unicast transmission information fed back by the terminal by using the UL resource.

In a possible example, in terms of receiving by the network device the HARQ response information of the one or more pieces of PTM transmission information and the HARQ response information of the one or more pieces of unicast transmission information fed back by the terminal by using the UL resource, the program 421 specifically includes instructions configured to perform the following. The network device receives the HARQ response information of the one or more pieces of PTM transmission information and the HARQ response information of the one or more pieces of unicast transmission information fed back by the terminal by using a first type of HARQ response information codebook or a second type of HARQ response information codebook according to a configuration of the network device.

In a possible example, if the network device receives the HARQ response information of the one or more pieces of PTM transmission information and the HARQ response information of the one or more pieces of unicast transmission information fed back by the terminal by using the second type of HARQ response information codebook, DAI bit fields carried in a DCI scheduling the one or more pieces of PTM transmission information and DAI bit fields carried in a DCI scheduling the one or more pieces of unicast transmission information are independently counted.

In a possible example, a set of values of a second interval between a time slot where the one or more pieces of PTM transmission information are located and a time slot where the UL resource is located, and a set of values of a third interval between a time slot where the one or more pieces of unicast transmission information are located and the time slot where the UL resource is located are respectively configured by the network device.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. HARQ response information codebooks corresponding to the one or more pieces of PTM transmission information are generated respectively. HARQ response information codebooks corresponding to the one or more pieces of unicast transmission information are generated respectively. A composite codebook is generated by cascading the HARQ response information codebooks corresponding to the one or more pieces of PTM transmission information and the HARQ response message codebooks corresponding to the one or more pieces of unicast transmission information.

In a possible example, in terms of receiving by the network device the HARQ response information of the preset information fed back by the terminal, the program 421 specifically includes instructions configured to perform the following. If a DCI scheduling the PTM transmission information contains information of a target geographic location range for the PTM transmission information, the network device receives the HARQ response information of the PTM transmission information fed back by the terminal when the terminal is located in the target geographic location range.

In a possible example, in terms of receiving by the network device the HARQ response information of the PTM transmission information fed back by the terminal when the terminal is located in the target geographic location range, the program 421 specifically includes instructions configured to perform the following. The network device receives the HARQ response information of the PTM transmission information fed back by the terminal by using a first target UL resource when the terminal is located in the target geographic location range, where the first target UL resource is indicated by the network device, and the first target UL resource is used for all terminals receiving the PTM transmission information to feed back the HARQ response information of the PTM transmission information.

In a possible example, a coverage of the network device is divided into multiple zones each corresponding to an ID, the information of the target geographic location range includes a reference zone ID and an effective distance, and the program 421 further includes instructions configured to perform the following. The network device determines a reference zone according to the reference zone ID. The network device determines a range within an effective distance from a center or an edge of the reference zone as the target geographic location range.

In a possible example, each scrambling code corresponds to a geographic location range, each scrambling code corresponds to a second target UL resource, a correspondence between scrambling codes and geographic location ranges and a correspondence between scrambling codes and second target UL resources are indicated by the network device, and in terms of receiving by the network device the HARQ response information of the preset information fed back by the terminal, the program 421 specifically includes instructions configured to perform the following. The network device indicates that the terminal determines the target geographic location range and a second target UL resource according to a scrambling code used for the DCI scheduling the PTM transmission information. The network device receives the HARQ response information of the PTM transmission information fed back by the terminal by using the second target UL resource when the terminal is located in the target geographic location range.

In a possible example, in terms of receiving by the network device the HARQ response information of the PTM transmission information fed back by the terminal when the terminal is located in the target geographic location range, the program 421 specifically includes instructions configured to perform the following. The network device receives the HARQ response information of the PTM transmission information fed back by the terminal by using a third target UL resource when the terminal is located in the target geographic location range, where the third target UL resource is indicated by the network device, and the third target UL resource is used for all terminals receiving the PTM transmission information within the target geographic location range to feed back the HARQ response information of the PTM transmission information to the network device.

In a possible example, the program 421 further includes instructions configured to perform the following. The network device receives geographic location information of the terminal fed back by the terminal according to a preset period or an indication of the network device. The network device transmits RRC information to the terminal, where the RRC information is used for the terminal to determine a second target scrambling code and a fourth target UL resource. The network device indicates that the terminal receives target PTM transmission information scheduled by a second target DCI when the second target DCI scrambled with the second target scrambling code is received. The network device receives HARQ response information of the target PTM transmission information fed back by the terminal by using the fourth target UL resource.

Technical solutions of embodiments of the disclosure have been elaborated above from the perspective of interaction between various network elements. It can be understood that, in order to implement the above functions, a terminal includes hardware structures and/or software modules for performing respective functions. Those of ordinary skill in the art will appreciate that units and algorithmic operations of various examples described in connection with embodiments herein can be implemented by hardware or by a combination of hardware and computer software. Whether these functions are performed by means of hardware or hardware driven by computer software depends on the application and the design constraints of the associated technical solution. Those skilled in the art may use different methods with regard to each particular application to implement the described functionality, but such methods should not be regarded as lying beyond the scope of the disclosure.

In embodiments of the disclosure, division of functional units of the terminal may be implemented according to the above method examples. For example, various functional units may be in one-to-one correspondence with each function, or two or more functions may be integrated into one processing unit. The integrated unit may be implemented in the form of hardware, or may be implemented in the form of software program module. Division of units in embodiments herein is illustrative and is only a division of logical functions, and there may exist other manners of division in practice.

Figure 5:
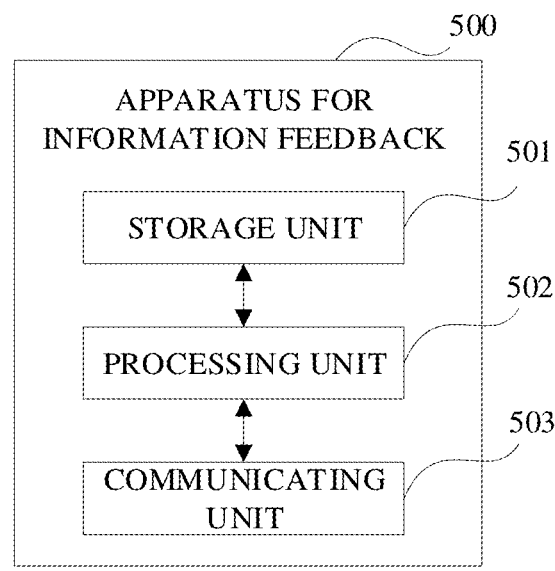
FIG. 5 is a block diagram of functional units of an apparatus for information feedback provided in embodiments of the disclosure.

If the integrated unit is adopted, FIG. 5 is a block diagram illustrating functional units of an apparatus for information feedback provided in embodiments of the disclosure. The apparatus 500 for information feedback is applicable to a terminal. The apparatus 500 specifically includes a processing unit 502 and a communicating unit 503. The processing unit 502 is configured to control and manage operations of the terminal. For example, the processing unit 502 is configured for the terminal to perform operations at step 202 and step 203 illustrated in FIG. 2A and/or other processes described in the technical solutions of the disclosure. The communicating unit 503 is configured for the terminal to communicate with other devices. The terminal may further include a storage unit 501. The storage unit 501 is configured to store program codes and data of the terminal.

The processing unit 502 may be a processor or a controller and may be, for example, a CPU, a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits described in the disclosure can be implemented or executed. The processor may also be a combination for implementing computing functions, for example, one or more microprocessors, a combination of DSP and microprocessor, or the like. The communicating unit 503 may be a communication interface, a transceiver, a transceiver circuit, etc. The storage unit 501 may be a memory. When the processing unit 502 is the processor, the communicating unit 503 is the communication interface, and the storage unit 501 is the memory, the terminal of embodiments of the disclosure may be the terminal illustrated in FIG. 3.

When implemented, the processing unit 502 is configured to perform any one of the operations performed by the terminal in the foregoing method embodiments. In addition, when performing data transmission such as transmitting and receiving, the processing unit 502 can invoke the communicating unit 503 to perform such an operation, which will be elaborated below.

The processing unit 502 is configured to control the terminal to: receive preset information from a network device, where the preset information at least includes PTM transmission information, and feed back HARQ response information of the preset information to the network device, where the HARQ response information includes HARQ response information of the PTM transmission information.

It can be seen that, in embodiments of the disclosure, the terminal receives the preset information from the network device, where the preset information at least includes the PTM transmission information, and the terminal feeds back the HARQ response information of the preset information to the network device, where the HARQ response information includes the HARQ response information of the PTM transmission information. It can be seen that, in the disclosure, there is a HARQ feedback mechanism when the terminal receives the PTM transmission information. When service data of PTM transmission is lost, the network device can determine whether a retransmission needs to be transmitted according to HARQ feedback information, which is beneficial to ensuring the reliability of service data transmission.

In a possible example, in terms of receiving by the terminal the preset information from the network device, the processing unit 502 is specifically configured to control the terminal to: receive a DCI scheduling the preset information from the network device, and receive the preset information according to indication information in the DCI.

In a possible example, the processing unit 502 is further configured to control the terminal to: determine a UL resource for the HARQ response information of the preset information according to the indication information in the DCI.

In a possible example, the preset information includes multiple pieces of PTM transmission information, and in terms of feeding back by the terminal the HARQ response information of the preset information to the network device, the processing unit 502 is specifically configured to control the terminal to: feed back HARQ response information of the multiple pieces of PTM transmission information to the network device by using different orthogonal UL resources.

In a possible example, if the multiple pieces of PTM transmission information are received by the terminal in multiple time slots, in terms of feeding back by the terminal the HARQ response information of the multiple pieces of PTM transmission information to the network device by using the different orthogonal UL resources, the processing unit 502 is specifically configured to control the terminal to: if UL resources for the HARQ response information of the multiple pieces of PTM transmission information overlap in time domain, and the multiple pieces of PTM transmission information each transmit different TBs, feed back HARQ response information of PTM transmission information in one of the time slots to the network device.

In a possible example, the HARQ response information of the PTM transmission information in the one of the time slots is determined by the terminal according to an implementation of the terminal, an order of start time of transmission of DCIs corresponding to the multiple pieces of PTM transmission information, or priorities of the multiple pieces of PTM transmission information.

In a possible example, if the multiple pieces of PTM transmission information are received by the terminal in multiple time slots, in terms of feeding back by the terminal the HARQ response information of the multiple pieces of PTM transmission information to the network device by using the different orthogonal UL resources, the processing unit 502 is specifically configured to control the terminal to: if different scrambling codes are used for DCIs scheduling the multiple pieces of PTM transmission information, feed back HARQ response information of one of the multiple pieces of PTM transmission information scheduled by a DCI corresponding to one of the scrambling codes to the network device.

In a possible example, the preset information includes multiple pieces of PTM transmission information, in terms of feeding back by the terminal the HARQ response information of the preset information to the network device, the processing unit 502 is specifically configured to control the terminal to: feed back HARQ response information of the multiple pieces of PTM transmission information to the network device by using a same UL resource.

In a possible example, if the multiple pieces of PTM transmission information are received by the terminal in multiple time slots, in terms of feeding back by the terminal the HARQ response information of the multiple pieces of PTM transmission information to the network device by using the same UL resource, the processing unit 502 is specifically configured to control the terminal to: if a same UL resource is used for the HARQ response information of the multiple pieces of PTM transmission information, and a same scrambling code is used for DCIs scheduling the multiple pieces of PTM transmission information, feed back the HARQ response information of all PTM transmission information to the network device by using the UL resource.

In a possible example, in terms of feeding back by the terminal the HARQ response information of all PTM transmission information to the network device by using the UL resource, the processing unit 502 is specifically configured to control the terminal to: feed back the HARQ response information of all PTM transmission information to the network device by using a first type of HARQ response information codebook or a second type of HARQ response information codebook according to a configuration of the network device.

In a possible example, if the terminal feeds back the HARQ response information of all PTM transmission information to the network device by using the second type of HARQ response information codebook, DAI bit fields carried in DCIs scrambled with a same scrambling code are independently counted.

In a possible example, if the multiple pieces of PTM transmission information are received by the terminal in multiple time slots, in terms of feeding back by the terminal the HARQ response information of the multiple pieces of PTM transmission information by using the same UL resource, the processing unit 502 is specifically configured to control the terminal to: if a same UL resource is used for the HARQ response information of the multiple pieces of PTM transmission information, and scrambling codes used for DCIs scheduling the multiple pieces of PTM transmission information are partially the same, feed back the HARQ response information of all PTM transmission information to the network device by using the UL resource.

In a possible example, in terms of feeding back by the terminal the HARQ response information of all PTM transmission information to the network device by using the UL resource, the processing unit 502 is specifically configured to control the terminal to: feed back the HARQ response information of all PTM transmission information to the network device by using a first type of HARQ response information codebook or a second type of HARQ response information codebook according to a configuration of the network device.

In a possible example, if the terminal feeds back the HARQ response information of all PTM transmission information to the network device by using the second type of HARQ response information codebook, DAI bit fields carried in DCIs scrambled with different scrambling codes are independently counted.

In a possible example, a set of values of a first interval between a time slot where the multiple pieces of PTM transmission information are located and a time slot where the UL resource is located is configured by the network device according to the scrambling codes.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. For each of the multiple pieces of PTM transmission information, a HARQ response information codebook corresponding to the PTM transmission information scheduled by a DCI scrambled with a first target scrambling code is generated according to HARQ response information of the PTM transmission information, where the first target scrambling code is one of different scrambling codes. A composite codebook is generated by cascading HARQ response information codebooks corresponding to the multiple pieces of PTM transmission information sequentially according to sizes of the scrambling codes.

In a possible example, the preset information includes one or more pieces of PTM transmission information and one or more pieces of unicast transmission information, in terms of feeding back by the terminal the HARQ response information of the preset information to the network device, the processing unit 502 is specifically configured to control the terminal to: feed back HARQ response information of the one or more pieces of PTM transmission information and HARQ response information of the one or more pieces of unicast transmission information to the network device by using different orthogonal UL resources.

In a possible example, in terms of feeding back by the terminal the HARQ response information of the one or more pieces of PTM transmission information and the HARQ response information of the one or more pieces of unicast transmission information by using the different orthogonal UL resources, the processing unit 502 is specifically configured to control the terminal to: if a UL resource for the HARQ response information of the one or more pieces of PTM transmission information and a UL resource for the HARQ response information of the one or more pieces of unicast transmission information overlap in time domain, feed back the HARQ response information of the one or more pieces of PTM transmission information or the HARQ response information of the one or more unicast transmission information to the network device.

In a possible example, the HARQ response information fed back is determined by the terminal according to an implementation of the terminal, an order of start time of transmission of DCIs corresponding to the one or more pieces of PTM transmission information and the one or more pieces of unicast transmission information, or priorities of the one or more pieces of PTM transmission information and the one or more pieces of unicast transmission information.

In a possible example, the preset information includes one or more pieces of PTM transmission information and one or more pieces of unicast transmission information, and in terms of feeding back by the terminal the HARQ response information of the preset information to the network device, the processing unit 502 is specifically configured to control the terminal to: feed back HARQ response information of the one or more pieces of PTM transmission information and HARQ response information of the one or more pieces of unicast transmission information to the network device by using a same UL resource.

In a possible example, in terms of feeding back by the terminal the HARQ response information of the one or more pieces of PTM transmission information and the HARQ response information of the one or more pieces of unicast transmission information to the network device by using the same UL resource, the processing unit 502 is specifically configured to control the terminal to: if a same UL resource is used for the HARQ response information of the one or more pieces of PTM transmission information and the HARQ response information of the one or more pieces of unicast transmission information, feed back the HARQ response information of the one or more pieces of PTM transmission information and the HARQ response information of the one or more pieces of unicast transmission information to the network device by using the UL resource.

In a possible example, in terms of feeding back by the terminal the HARQ response information of the one or more pieces of PTM transmission information and the HARQ response information of the one or more pieces of unicast transmission information to the network device by using the UL resource, the processing unit 502 is specifically configured to control the terminal to: feed back the HARQ response information of the one or more pieces of PTM transmission information and the HARQ response information of the one or more pieces of unicast transmission information by using a first type of HARQ response information codebook or a second type of HARQ response information codebook according to a configuration of the network device.

In a possible example, if the terminal feeds back the HARQ response information of the one or more pieces of PTM transmission information and the HARQ response information of the one or more pieces of unicast transmission information to the network device by using the second type of HARQ response information codebook, DAI bit fields carried in a DCI scheduling the one or more pieces of PTM transmission information and DAI bit fields carried in a DCI scheduling the one or more pieces of unicast transmission information are independently counted.

In a possible example, a set of values of a second interval between a time slot where the one or more pieces of PTM transmission information are located and a time slot where the UL resource is located, and a set of values of a third interval between a time slot where the one or more pieces of unicast transmission information are located and the time slot where the UL resource is located are respectively configured by the network device.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. HARQ response information codebooks corresponding to the one or more pieces of PTM transmission information are generated respectively. HARQ response information codebooks corresponding to the one or more pieces of unicast transmission information are generated respectively. A composite codebook is generated by cascading the HARQ response information codebooks corresponding to the one or more pieces of PTM transmission information and the HARQ response message codebooks corresponding to the one or more pieces of unicast transmission information.

In a possible example, in terms of feeding back by the terminal the HARQ response information of the preset information to the network device, the processing unit 502 is specifically configured to control the terminal to: if a DCI scheduling the PTM transmission information contains information of a target geographic location range for the PTM transmission information, feed back the HARQ response information of the PTM transmission information to the network device when the terminal is located in the target geographic location range.

In a possible example, in terms of feeding back by the terminal the HARQ response information of the PTM transmission information to the network device when the terminal is located in the target geographic location range, the processing unit 502 is specifically configured to control the terminal to: feed back the HARQ response information of the PTM transmission information to the network device by using a first target UL resource when the terminal is located in the target geographic location range, where the first target UL resource is indicated by the network device, and the first target UL resource is used for all terminals receiving the PTM transmission information to feed back the HARQ response information of the PTM transmission information.

In a possible example, a coverage of the network device is divided into multiple zones each corresponding to an ID, the information of the target geographic location range includes a reference zone ID and an effective distance, and the processing unit 502 is further configured to control the terminal to: determine a reference zone according to the reference zone ID, and determine a range within an effective distance from a center or an edge of the reference zone as the target geographic location range.

In a possible example, each scrambling code corresponds to a geographic location range, each scrambling code corresponds to a second target UL resource, a correspondence between scrambling codes and geographic location ranges and a correspondence between scrambling codes and second target UL resources are indicated by the network device, and in terms of feeding back by the terminal the HARQ response information of the preset information to the network device, the processing unit 502 is specifically configured to control the terminal to: determine the target geographic location range and a second target UL resource according to a scrambling code used for the DCI scheduling the PTM transmission information, and feed back the HARQ response information of the PTM transmission information to the network device by using the second target UL resource when the terminal is located in the target geographic location range.

In a possible example, in terms of feeding back by the terminal the HARQ response information of the PTM transmission information to the network device when the terminal is located in the target geographic location range, the processing unit 502 is specifically configured to control the terminal to: feed back the HARQ response information of the PTM transmission information to the network device by using a third target UL resource when the terminal is located in the target geographic location range, where the third target UL resource is indicated by the network device, and the third target UL resource is used for all terminals receiving the PTM transmission information within the target geographic location range to feed back the HARQ response information of the PTM transmission information to the network device.

In a possible example, the processing unit 502 is further configured to control the terminal to: feed back geographic location information of the terminal to the network device according to a preset period or an indication of the network device, receive RRC information from the network device, determine a second target scrambling code and a fourth target UL resource according to the RRC information, receive target PTM transmission information scheduled by a second target DCI when the second target DCI scrambled with the second target scrambling code is received, and feed back HARQ response information of the target PTM transmission information to the network device by using the fourth target UL resource.

Figure 6:
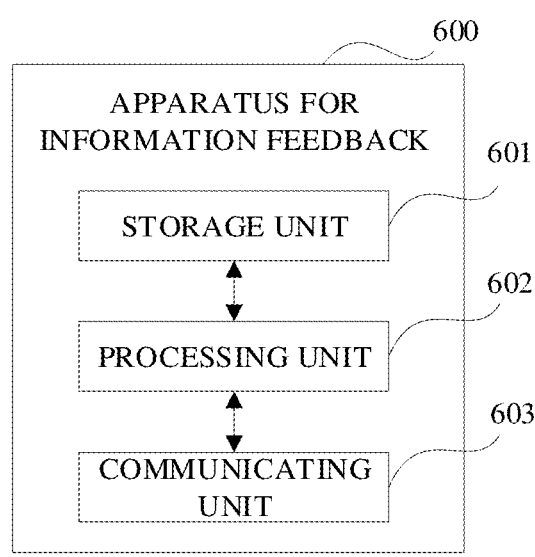
FIG. 6 is a block diagram of functional units of another apparatus for information feedback provided in embodiments of the disclosure.

If the integrated unit is adopted, FIG. 6 is a block diagram illustrating functional units of an apparatus for information feedback provided in embodiments of the disclosure. The apparatus 600 for information feedback is applicable to a network device. The apparatus 600 includes a processing unit 602 and a communicating unit 603. The processing unit 602 is configured to control and manage operations of the network device. For example, the processing unit 602 is configured for the network device to perform operations at step 201 and step 204 illustrated in FIG. 2A and/or other processes described in the technical solutions of implementations. The communicating unit 603 is configured for the network device to communicate with other devices. The network device may further include a storage unit 601. The storage unit 601 is configured to store program codes and data of the network device.

The processing unit 602 may be a processor or a controller and may be, for example, a CPU, a general-purpose processor, a DSP, an ASIC, an FPGA, or other programmable logic devices, transistor logic devices, hardware components, or a combination thereof. Various exemplary logic blocks, modules, and circuits disclosed in implementations can be implemented or executed. The processor may also be a combination for implementing computing functions, for example, one or more microprocessors, a combination of DSP and microprocessor, or the like. The communicating unit 603 may be a communication interface, a transceiver, a transceiver circuit, etc. The storage unit 601 may be a memory. When the processing unit 602 is the processor, the communicating unit 603 is the communication interface, and the storage unit 601 is the memory, the terminal of embodiments of the disclosure may be the network device illustrated in FIG. 4.

When implemented, the processing unit 602 is configured to perform any one of the operations performed by the network device in the foregoing method embodiments. In addition, when performing data transmission such as transmitting and receiving, the processing unit 602 can invoke the communicating unit 603 to perform such an operation, which will be elaborated below.

The processing unit 602 is configured to control the network device to: transmit preset information to a terminal, where the preset information at least includes PTM transmission information, and receive HARQ response information of the preset information fed back by the terminal, where the HARQ response information includes HARQ response information of the PTM transmission information.

It can be seen that, in embodiments of the disclosure, the network device transmits the preset information to the terminal, where the preset information at least includes the PTM transmission information. The network device receives the HARQ response information of the preset information fed back by the terminal, where the HARQ response information includes the HARQ response information of the PTM transmission information. It can be seen that, in the disclosure, there is a HARQ feedback mechanism when the network device transmits the PTM transmission information to the terminal. When service data of PTM transmission is lost, the terminal may transmit HARQ feedback information to the network device, and the network device can determine whether a retransmission needs to be transmitted according to the HARQ feedback information, which is beneficial to ensuring the reliability of service data transmission.

In a possible example, in terms of transmitting by the network device the preset information to the terminal, the processing unit 602 is specifically configured to control the network device to: transmit a DCI scheduling the preset information to the terminal, where the DCI is used for the terminal to receive the preset information according to indication information in the DCI.

In a possible example, the DCI is further used for the terminal to determine a UL resource for the HARQ response information of the preset information according to the indication information in the DCI.

In a possible example, the preset information includes multiple pieces of PTM transmission information, and in terms of receiving by the network device the HARQ response information of the preset information fed back by the terminal, the processing unit 602 is specifically configured to control the network device to: receive HARQ response information of the multiple pieces of PTM transmission information fed back by the terminal by using different orthogonal UL resources.

In a possible example, if the network device indicates that the multiple pieces of PTM transmission information are received by the terminal in multiple time slots, in terms of receiving by the network device the HARQ response information of the multiple pieces of PTM transmission information fed back by the terminal by using the different orthogonal UL resources, the processing unit 602 is specifically configured to control the network device to: if UL resources for the HARQ response information of the multiple pieces of PTM transmission information overlap in time domain, and the multiple pieces of PTM transmission information each transmit different TBs, receive HARQ response information of PTM transmission information in one of the time slots fed back by the terminal.

In a possible example, the HARQ response information of the PTM transmission information in the one of the time slots is determined by the terminal according to an implementation of the terminal, an order of start time of transmission of DCIs corresponding to the multiple pieces of PTM transmission information, or priorities of the multiple pieces of PTM transmission information.

In a possible example, if the network device indicates that the multiple pieces of PTM transmission information are received by the terminal in multiple time slots, in terms of receiving by the network device the HARQ response information of the multiple pieces of PTM transmission information fed back by the terminal by using the different orthogonal UL resources, the processing unit 602 is specifically configured to control the network device to: if different scrambling codes are used for DCIs scheduling the multiple pieces of PTM transmission information, receive HARQ response information of one of the multiple pieces of PTM transmission information scheduled by a DCI corresponding to one of the scrambling codes fed back by the terminal.

In a possible example, the preset information includes multiple pieces of PTM transmission information, and in terms of receiving by the network device the HARQ response information of the preset information fed back by the terminal, the processing unit 602 is specifically configured to control the network device to: receive HARQ response information of the multiple pieces of PTM transmission information fed back by the terminal by using a same UL resource.

In a possible example, if the network device indicates that the multiple pieces of PTM transmission information are received by the terminal in multiple time slots, in terms of receiving by the network device the HARQ response information of the multiple pieces of PTM transmission information fed back by the terminal by using the same UL resource, the processing unit 602 is specifically configured to control the network device to: if a same UL resource is used for the HARQ response information of the multiple pieces of PTM transmission information, and a same scrambling code is used for DCIs scheduling the multiple pieces of PTM transmission information, receive the HARQ response information of all PTM transmission information fed back by the terminal by using the UL resource.

In a possible example, in terms of receiving by the network device the HARQ response information of all PTM transmission information fed back by the terminal by using the UL resource, the processing unit 602 is specifically configured to control the network device to: receive the HARQ response information of all PTM transmission information fed back by the terminal by using a first type of HARQ response information codebook or a second type of HARQ response information codebook according to a configuration of the network device.

In a possible example, if the network device receives the HARQ response information of all PTM transmission information fed back by the terminal by using the second type of HARQ response information codebook, DAI bit fields carried in DCIs scrambled with a same scrambling code are independently counted.

In a possible example, if the network device indicates that the multiple pieces of PTM transmission information are received by the terminal in multiple time slots, in terms of receiving, by the network device, the HARQ response information of the multiple pieces of PTM transmission information fed back by the terminal by using the same UL resource, the processing unit 602 is specifically configured to control the network device to: if a same UL resource is used for the HARQ response information of the multiple pieces of PTM transmission information, and scrambling codes used for DCIs scheduling the multiple pieces of PTM transmission information are partially the same, receive the HARQ response information of all PTM transmission information fed back by the terminal by using the UL resource.

In a possible example, in terms of receiving by the network device the HARQ response information of all PTM transmission information fed back by the terminal by using the UL resource, the processing unit 602 is specifically configured to control the network device to: receive the HARQ response information of all PTM transmission information fed back by the terminal by using a first type of HARQ response information codebook or a second type of HARQ response information codebook according to a configuration of the network device.

In a possible example, if the network device receives the HARQ response information of all PTM transmission information fed back by the terminal by using the second type of HARQ response information codebook, DAI bit fields carried in DCIs scrambled with different scrambling codes are independently counted.

In a possible example, a set of values of a first interval between a time slot where the multiple pieces of PTM transmission information are located and a time slot where the UL resource is located is configured by the network device according to the scrambling codes.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. For each of the multiple pieces of PTM transmission information, a HARQ response information codebook corresponding to the PTM transmission information scheduled by a DCI scrambled with a first target scrambling code is generated according to HARQ response information of the PTM transmission information, where the first target scrambling code is one of different scrambling codes. A composite codebook is generated by cascading HARQ response information codebooks corresponding to the multiple pieces of PTM transmission information sequentially according to sizes of the scrambling codes.

In a possible example, the preset information includes one or more pieces of PTM transmission information and one or more pieces of unicast transmission information, and in terms of receiving by the network device the HARQ response information of the preset information fed back by the terminal, the processing unit 602 is specifically configured to control the network device to: receive HARQ response information of the one or more pieces of PTM transmission information and HARQ response information of the one or more pieces of unicast transmission information fed back by the terminal by using different orthogonal UL resources.

In a possible example, in terms of receiving by the network device the HARQ response information of the one or more pieces of PTM transmission information and the HARQ response information of the one or more pieces of unicast transmission information fed back by the terminal by using the different orthogonal UL resources, the processing unit 602 is specifically configured to control the network device to: if a UL resource for the HARQ response information of the one or more pieces of PTM transmission information and a UL resource for the HARQ response information of the one or more pieces of unicast transmission information overlap in time domain, receive the HARQ response information of the one or more pieces of PTM transmission information or the HARQ response information of the one or more unicast transmission information fed back by the terminal.

In a possible example, the HARQ response information fed back is determined by the terminal according to an implementation of the terminal, an order of start time of transmission of DCIs corresponding to the one or more pieces of PTM transmission information and the one or more pieces of unicast transmission information, or priorities of the one or more pieces of PTM transmission information and the one or more pieces of unicast transmission information.

In a possible example, the preset information includes one or more pieces of PTM transmission information and one or more pieces of unicast transmission information, and in terms of receiving by the network device the HARQ response information of the preset information fed back by the terminal, the processing unit 602 is specifically configured to control the network device to: receive HARQ response information of the one or more pieces of PTM transmission information and HARQ response information of the one or more pieces of unicast transmission information fed back by the terminal by using a same UL resource.

In a possible example, in terms of receiving by the network device the HARQ response information of the one or more pieces of PTM transmission information and the HARQ response information of the one or more pieces of unicast transmission information fed back by the terminal by using the same UL resource, the processing unit 602 is specifically configured to control the network device to: if a same UL resource is used for the HARQ response information of the one or more pieces of PTM transmission information and the HARQ response information of the one or more pieces of unicast transmission information, receive the HARQ response information of the one or more pieces of PTM transmission information and the HARQ response information of the one or more pieces of unicast transmission information fed back by the terminal by using the UL resource.

In a possible example, in terms of receiving by the network device the HARQ response information of the one or more pieces of PTM transmission information and the HARQ response information of the one or more pieces of unicast transmission information fed back by the terminal by using the UL resource, the processing unit 602 is specifically configured to control the network device to: receive the HARQ response information of the one or more pieces of PTM transmission information and the HARQ response information of the one or more pieces of unicast transmission information fed back by the terminal by using a first type of HARQ response information codebook or a second type of HARQ response information codebook according to a configuration of the network device.

In a possible example, if the network device receives the HARQ response information of the one or more pieces of PTM transmission information and the HARQ response information of the one or more pieces of unicast transmission information fed back by the terminal by using the second type of HARQ response information codebook, DAI bit fields carried in a DCI scheduling the one or more pieces of PTM transmission information and DAI bit fields carried in a DCI scheduling the one or more pieces of unicast transmission information are independently counted.

In a possible example, a set of values of a second interval between a time slot where the one or more pieces of PTM transmission information are located and a time slot where the UL resource is located, and a set of values of a third interval between a time slot where the one or more pieces of unicast transmission information are located and the time slot where the UL resource is located are respectively configured by the network device.

In a possible example, the UL resource is used to feed back HARQ response information of at most N pieces of PTM transmission information scheduled by DCIs scrambled with different scrambling codes, and a value of N is preset or configured by the network device.

In a possible example, a HARQ response information codebook is generated as follows. HARQ response information codebooks corresponding to the one or more pieces of PTM transmission information are generated respectively. HARQ response information codebooks corresponding to the one or more pieces of unicast transmission information are generated respectively. A composite codebook is generated by cascading the HARQ response information codebooks corresponding to the one or more pieces of PTM transmission information and the HARQ response message codebooks corresponding to the one or more pieces of unicast transmission information.

In a possible example, in terms of receiving by the network device the HARQ response information of the preset information fed back by the terminal, the processing unit 602 is specifically configured to control the network device to: if a DCI scheduling the PTM transmission information contains information of a target geographic location range for the PTM transmission information, receive the HARQ response information of the PTM transmission information fed back by the terminal when the terminal is located in the target geographic location range.

In a possible example, in terms of receiving by the network device the HARQ response information of the PTM transmission information fed back by the terminal when the terminal is located in the target geographic location range, the processing unit 602 is specifically configured to control the network device to: receive the HARQ response information of the PTM transmission information fed back by the terminal by using a first target UL resource when the terminal is located in the target geographic location range, where the first target UL resource is indicated by the network device, and the first target UL resource is used for all terminals receiving the PTM transmission information to feed back the HARQ response information of the PTM transmission information.

In a possible example, a coverage of the network device is divided into multiple zones each corresponding to an ID, the information of the target geographic location range includes a reference zone ID and an effective distance, and the processing unit 602 is further configured to control the network device to: determine a reference zone according to the reference zone ID, and determine a range within an effective distance from a center or an edge of the reference zone as the target geographic location range.

In a possible example, each scrambling code corresponds to a geographic location range, each scrambling code corresponds to a second target UL resource, a correspondence between scrambling codes and geographic location ranges and a correspondence between scrambling codes and second target UL resources are indicated by the network device, and in terms of receiving by the network device the HARQ response information of the preset information fed back by the terminal, the processing unit 602 is specifically configured to control the network device to: indicate that the terminal determines the target geographic location range and a second target UL resource according to a scrambling code used for the DCI scheduling the PTM transmission information, and receive the HARQ response information of the PTM transmission information fed back by the terminal by using the second target UL resource when the terminal is located in the target geographic location range.

In a possible example, in terms of receiving by the network device the HARQ response information of the PTM transmission information fed back by the terminal when the terminal is located in the target geographic location range, the processing unit 602 is specifically configured to control the network device to: receive the HARQ response information of the PTM transmission information fed back by the terminal by using a third target UL resource when the terminal is located in the target geographic location range, where the third target UL resource is indicated by the network device, and the third target UL resource is used for all terminals receiving the PTM transmission information within the target geographic location range to feed back the HARQ response information of the PTM transmission information to the network device.

In a possible example, the processing unit 602 is further configured to control the network device to: receive geographic location information of the terminal fed back by the terminal according to a preset period or an indication of the network device, transmit RRC information to the terminal, where the RRC information is used for the terminal to determine a second target scrambling code and a fourth target UL resource, indicate that the terminal receives target PTM transmission information scheduled by a second target DCI when the second target DCI scrambled with the second target scrambling code is received, and receive HARQ response information of the target PTM transmission information fed back by the terminal by using the fourth target UL resource.

It can be understood that, since method embodiments and apparatus embodiments are different presentation forms of the same technical concept, the content of the method embodiments of the disclosure should be synchronized to the apparatus embodiments, which will not be repeated herein.

Embodiments of the disclosure further provide a chip. The chip includes a processor. The processor is configured to invoke and execute computer programs stored in a memory, to cause a device equipped with the chip to perform some or all operations performed by a terminal in the foregoing method embodiments.

Embodiments of the disclosure further provide a computer readable storage medium. The computer readable storage medium is configured to store computer programs used for electronic data interchange. The computer programs are operable with a computer to perform some or all operations performed by a terminal in the foregoing method embodiments.

Embodiments of the disclosure further provide a computer readable storage medium. The computer readable storage medium is configured to store computer programs used for EDI. The computer programs are operable with a computer to perform some or all operations performed by a network-side device in the foregoing method embodiments.

Embodiments of the disclosure further provide a computer program product. The computer program product includes computer programs. The computer programs are operable with a computer to perform some or all operations performed by a terminal in the foregoing method embodiments. The computer program product may be a software installation package.

The steps of the method or algorithm described in embodiments of the disclosure may be implemented by means of hardware, or may be implemented by executing software instructions by a processor. The software instructions can be implemented by corresponding software modules, which can be stored in a random-access memory (RAM), a flash memory, a read only memory (ROM), an erasable programmable ROM (EPROM), an electrically EPROM, EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in an access network device, a target network device, or a core network device. The processor and the storage medium may also be present as discrete components in the access network device, the target network device, or the core network device.

Those skilled in the art will appreciate that, all or part of functions described in one or more of the foregoing examples can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the embodiments of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid-state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for information feedback, comprising:
    receiving, by a terminal, downlink control information (DCI) scheduling preset information from a network device;
    receiving, by the terminal, the preset information from the network device according to the DCI, the preset information at least comprising point-to-multipoint (PTM) transmission information; and
    feeding back, by the terminal, hybrid automatic repeat request (HARQ) response information of the preset information to the network device, the HARQ response information comprising HARQ response information of the PTM transmission information, wherein the preset information comprises a plurality of pieces of PTM transmission information, and feeding back, by the terminal, the HARQ response information of the preset information to the network device comprises:
        feeding back, by the terminal, HARQ response information of the plurality of pieces of PTM transmission information to the network device by using a same uplink (UL) resource;
    wherein if the plurality of pieces of PTM transmission information are received by the terminal in a plurality of time slots, feeding back, by the terminal, the HARQ response information of the plurality of pieces of PTM transmission information by using the same UL resource comprises:
        if a same UL resource is used for the HARQ response information of the plurality of pieces of PTM transmission information, and scrambling codes used for DCIs scheduling the plurality of pieces of PTM transmission information are partially the same,
            feeding back, by the terminal, the HARQ response information of all PTM transmission information to the network device by using the UL resource.

2. The method of claim 1, wherein if the plurality of pieces of PTM transmission information are received by the terminal in a plurality of time slots, feeding back, by the terminal, the HARQ response information of the plurality of pieces of PTM transmission information to the network device by using the same UL resource comprises:
    if a same UL resource is used for the HARQ response information of the plurality of pieces of PTM transmission information, and a same scrambling code is used for DCIs scheduling the plurality of pieces of PTM transmission information,
        feeding back, by the terminal, the HARQ response information of all PTM transmission information to the network device by using the UL resource.

3. The method of claim 1, wherein feeding back, by the terminal, the HARQ response information of all PTM transmission information to the network device by using the UL resource comprises:
    feeding back, by the terminal, the HARQ response information of all PTM transmission information to the network device by using a first type of HARQ response information codebook or a second type of HARQ response information codebook according to a configuration of the network device, wherein
    if the terminal feeds back the HARQ response information of all PTM transmission information to the network device by using the second type of HARQ response information codebook, downlink assignment index (DAI) bit fields carried in DCIs scrambled with different scrambling codes are independently counted.

4. The method of claim 1, wherein generating a HARQ response information codebook comprises:
    for each of the plurality of pieces of PTM transmission information, generating a HARQ response information codebook corresponding to the PTM transmission information scheduled by a DCI scrambled with a first target scrambling code, according to HARQ response information of the PTM transmission information, wherein the first target scrambling code is one of different scrambling codes; and
    generating a composite codebook by cascading HARQ response information codebooks corresponding to the plurality of pieces of PTM transmission information sequentially according to sizes of the scrambling codes.

5. The method of claim 1, wherein the preset information comprises one or more pieces of PTM transmission information and one or more pieces of unicast transmission information, and feeding back, by the terminal, the HARQ response information of the preset information to the network device comprises:
    feeding back, by the terminal, HARQ response information of the one or more pieces of PTM transmission information and HARQ response information of the one or more pieces of unicast transmission information to the network device by using a same UL resource, wherein feeding back, by the terminal, the HARQ response information of the one or more pieces of PTM transmission information and the HARQ response information of the one or more pieces of unicast transmission information to the network device by using the same UL resource comprises:
        if a same UL resource is used for the HARQ response information of the one or more pieces of PTM transmission information and the HARQ response information of the one or more pieces of unicast transmission information,
feeding back, by the terminal, the HARQ response information of the one or more pieces of PTM transmission information and the HARQ response information of the one or more pieces of unicast transmission information to the network device by using the UL resource.

6. The method of claim 5, wherein feeding back, by the terminal, the HARQ response information of the one or more pieces of PTM transmission information and the HARQ response information of the one or more pieces of unicast transmission information to the network device by using the UL resource comprises:
feeding back, by the terminal, the HARQ response information of the one or more pieces of PTM transmission information and the HARQ response information of the one or more pieces of unicast transmission information to the network device by using a first type of HARQ response information codebook or a second type of HARQ response information codebook according to a configuration of the network device.

7. The method of claim 6, wherein if the terminal feeds back the HARQ response information of the one or more pieces of PTM transmission information and the HARQ response information of the one or more pieces of unicast transmission information to the network device by using the second type of HARQ response information codebook, DAI bit fields carried in a DCI scheduling the one or more pieces of PTM transmission information and DAI bit fields carried in a DCI scheduling the one or more pieces of unicast transmission information are independently counted.

8. The method of claim 5, wherein a set of values of a second interval between a time slot where the one or more pieces of PTM transmission information are located and a time slot where the UL resource is located, and a set of values of a third interval between a time slot where the one or more pieces of unicast transmission information are located and the time slot where the UL resource is located are respectively configured by the network device.

9. The method of claim 5, wherein generating a HARQ response information codebook comprises:
generating, HARQ response information codebooks corresponding to the one or more pieces of PTM transmission information respectively;
generating HARQ response information codebooks corresponding to the one or more pieces of unicast transmission information respectively; and
generating a composite codebook by cascading the HARQ response information codebooks corresponding to the one or more pieces of PTM transmission information and the HARQ response message codebooks corresponding to the one or more pieces of unicast transmission information.

10. A method for information feedback, comprising:
transmitting, by a network device, downlink control information (DCI) scheduling preset information to a terminal;
transmitting, by the network device, the preset information to a terminal, the preset information at least comprising point-to-multipoint (PTM) transmission information; and
receiving, by the network device, hybrid automatic repeat request (HARQ) response information of the preset information fed back by the terminal, the HARQ response information comprising HARQ response information of the PTM transmission information, wherein the preset information comprises a plurality of pieces of PTM transmission information, and receiving, by the network device, the HARQ response information of the preset information fed back by the terminal comprises:
receiving, by the network device, HARQ response information of the plurality of pieces of PTM transmission information fed back by the terminal by using a same uplink (UL) resource;
wherein if the network device indicates that the plurality of pieces of PTM transmission information are received by the terminal in a plurality of time slots, receiving, by the network device, the HARQ response information of the plurality of pieces of PTM transmission information fed back by the terminal by using the same UL resource comprises:
if a same UL resource is used for the HARQ response information of the plurality of pieces of PTM transmission information, and scrambling codes used for DCIs scheduling the plurality of pieces of PTM transmission information are partially the same, receiving, by the network device, the HARQ response information of all PTM transmission information fed back by the terminal by using the UL resource.

11. The method of claim 10, wherein receiving, by the network device, the HARQ response information of all PTM transmission information fed back by the terminal by using the UL resource comprises:
receiving, by the network device, the HARQ response information of all PTM transmission information fed back by the terminal by using a first type of HARQ response information codebook or a second type of HARQ response information codebook according to a configuration of the network device, wherein
if the network device receives the HARQ response information of all PTM transmission information fed back by the terminal by using the second type of HARQ response information codebook, downlink assignment index (DAI) bit fields carried in DCIs scrambled with different scrambling codes are independently counted.

12. The method of claim 10, wherein generating a HARQ response information codebook comprises:
for each of the plurality of pieces of PTM transmission information, generating a HARQ response information codebook corresponding to the PTM transmission information scheduled by a DCI scrambled with a first target scrambling code, according to HARQ response information of the PTM transmission information, wherein the first target scrambling code is one of different scrambling codes; and
generating a composite codebook by cascading HARQ response information codebooks corresponding to the plurality of pieces of PTM transmission information sequentially according to sizes of the scrambling codes.

13. The method of claim 10, wherein the preset information comprises one or more pieces of PTM transmission information and one or more pieces of unicast transmission information, and receiving, by the network device, the HARQ response information of the preset information fed back by the terminal comprises:
receiving, by the network device, HARQ response information of the one or more pieces of PTM transmission information and HARQ response information of the one or more pieces of unicast transmission information fed back by the terminal by using a same UL resource, wherein receiving, by the network device, the HARQ response information of the one or more pieces of PTM transmission information and the HARQ response information of the one or more pieces of unicast transmission information fed back by the terminal by using the same UL resource comprises:

if a same UL resource is used for the HARQ response information of the one or more pieces of PTM transmission information and the HARQ response information of the one or more pieces of unicast transmission information,
    receiving, by the network device, the HARQ response information of the one or more pieces of PTM transmission information and the HARQ response information of the one or more pieces of unicast transmission information fed back by the terminal by using the UL resource.

14. A terminal comprising:

a processor;

a transceiver; and a memory configured to store one or more programs, wherein the processor is configured to invoke and execute the computer programs stored in the memory to cause the transceiver to:
    receive downlink control information (DCI) scheduling preset information from a network device;
    receive the preset information from the network device according to the DCI, the preset information at least comprising point-to-multipoint (PTM) transmission information; and
    feed back hybrid automatic repeat request (HARQ) response information of the preset information to the network device, the HARQ response information comprising HARQ response information of the PTM transmission information, wherein the preset information comprises a plurality of pieces of PTM transmission information, and the transceiver configured to feed back the HARQ response information of the preset information to the network device is configured to:

feed back HARQ response information of the plurality of pieces of PTM transmission information to the network device by using a same uplink (UL) resource;

wherein if the network device indicates that the plurality of pieces of PTM transmission information are received by the terminal in a plurality of time slots, receiving, by the network device, the HARQ response information of the plurality of pieces of PTM transmission information fed back by the terminal by using the same UL resource comprises:
    if a same UL resource is used for the HARQ response information of the plurality of pieces of PTM transmission information, and scrambling codes used for DCIs scheduling the plurality of pieces of PTM transmission information are partially the same,
        receiving, by the network device, the HARQ response information of all PTM transmission information fed back by the terminal by using the UL resource.

* * * * *